United States Patent
Ke et al.

(10) Patent No.: US 12,421,326 B2
(45) Date of Patent: Sep. 23, 2025

(54) CYCLODEXTRIN-BASED POLYROTAXANES AND PROTEIN HYBRIDS AS THREE-DIMENSIONAL PRINTING INKS

(71) Applicant: Trustees of Dartmouth College, Hanover, NH (US)

(72) Inventors: Chenfeng Ke, Hanover, NH (US); Qianming Lin, Hanover, NH (US); Longyu Li, Hanover, NH (US); Miao Tang, Hanover, NH (US)

(73) Assignee: Trustees of Dartmouth College, Hanover, NH (US)

( * ) Notice: Subject to any disclaimer, the term of this patent is extended or adjusted under 35 U.S.C. 154(b) by 514 days.

(21) Appl. No.: 17/921,059

(22) PCT Filed: May 10, 2021

(86) PCT No.: PCT/US2021/031495
§ 371 (c)(1),
(2) Date: Oct. 24, 2022

(87) PCT Pub. No.: WO2021/226567
PCT Pub. Date: Nov. 11, 2021

(65) Prior Publication Data
US 2023/0174680 A1 Jun. 8, 2023

Related U.S. Application Data

(60) Provisional application No. 63/021,971, filed on May 8, 2020.

(51) Int. Cl.
*B33Y 70/00* (2020.01)
*C08B 37/16* (2006.01)
(Continued)

(52) U.S. Cl.
CPC .......... *C08B 37/0015* (2013.01); *B33Y 70/00* (2014.12); *C08G 83/007* (2013.01);
(Continued)

(58) Field of Classification Search
None
See application file for complete search history.

(56) References Cited

U.S. PATENT DOCUMENTS 5,531,871 A * 7/1996 Fauteux ............ H01M 10/0565
429/188
6,828,378 B2 * 12/2004 Okumura ............. C09D 105/16
525/461

(Continued)

FOREIGN PATENT DOCUMENTS

WO WO 2016/174266 11/2016
WO WO 2018/200944 11/2018

OTHER PUBLICATIONS

International Search Report and Written Opinion for PCT/US2021/031495, Mailed on Aug. 10, 2021.

*Primary Examiner* — Peter A Salamon
(74) *Attorney, Agent, or Firm* — Shackelford, McKinley & Norton, LLP

(57) ABSTRACT

Embodiments of the present disclosure pertain to a composition that includes a rotaxane. The rotaxane includes a plurality of macrocyclic rings and a polymer with a molecular weight below 10,000 Da that is covalently appended to one or more sterically hindered molecules. The cavities of the macrocyclic rings are threaded onto the polymer. The plurality of threaded macrocyclic rings include a plurality of different segments that each include a plurality of threaded macrocyclic rings. Each of the plurality of different segments is in the form of a crystalline network. Further embodiments of the present disclosure pertain to methods of forming the rotaxanes by covalently appending one or more (Continued)

sterically hindered molecules onto a polymer and threading a plurality of macrocyclic rings onto the polymer. Additional embodiments of the present disclosure pertain to methods of manufacturing a three-dimensional structure by applying a composition of the present disclosure onto a surface.

25 Claims, 27 Drawing Sheets

(51) Int. Cl.
*C08G 83/00* (2006.01)
*C09D 5/02* (2006.01)
*C09D 105/16* (2006.01)
*C09D 187/00* (2006.01)

(52) U.S. Cl.
CPC ............. *C09D 5/02* (2013.01); *C09D 105/16* (2013.01); *C09D 187/005* (2013.01)

(56) References Cited

U.S. PATENT DOCUMENTS

| | | | |
|---|---|---|---|
| 7,821,675 B2 | 10/2010 | Coyle et al. | |
| 9,266,972 B2* | 2/2016 | Yamasaki | C08G 65/3331 |
| 9,409,999 B2* | 8/2016 | Yamasaki | C08G 65/3331 |
| 10,259,913 B2* | 4/2019 | Stoddart | C07D 471/22 |
| 10,329,386 B2* | 6/2019 | Harada | C08G 65/3346 |
| 10,526,533 B2* | 1/2020 | Shimizu | C08G 18/3876 |
| 10,920,007 B2* | 2/2021 | Shimizu | C08G 18/7621 |
| 10,954,315 B2 | 3/2021 | Ke et al. | |
| 11,053,357 B2* | 7/2021 | Hayashi | C09D 175/04 |
| 11,066,523 B2* | 7/2021 | Takenaka | C08G 65/48 |
| 11,248,092 B2* | 2/2022 | Ali | C08K 5/14 |
| 2007/0205395 A1* | 9/2007 | Nakajima | C09K 19/3458 |
| | | | 252/299.01 |
| 2016/0137845 A1* | 5/2016 | Stoddart | C09B 57/001 |
| | | | 536/103 |
| 2019/0144569 A1* | 5/2019 | Ke | A61L 15/26 |
| | | | 428/159 |
| 2020/0131383 A1* | 4/2020 | Ke | B29C 64/314 |
| 2021/0171668 A1 | 6/2021 | Ke et al. | |

* cited by examiner

PEGS FOR BOTH END THREADING
PEGS FOR ONE END THREADING
PEGS WITH DUAL SPEED BUMPS
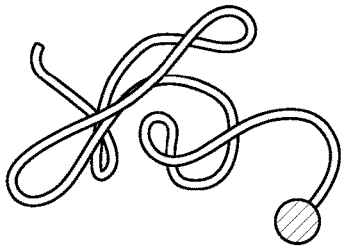
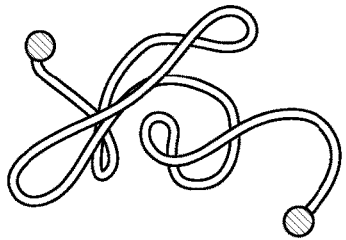
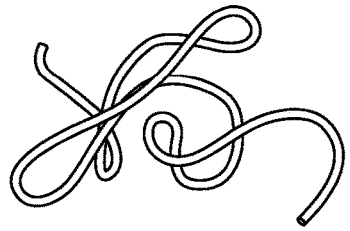
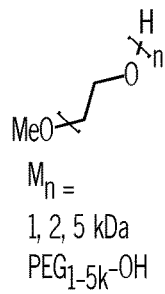
$M_n = 1, 2, 5$ kDa
$PEG_{1-5k}-OH$
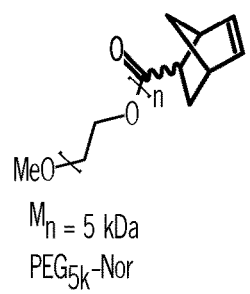
$M_n = 5$ kDa
$PEG_{5k}-Nor$
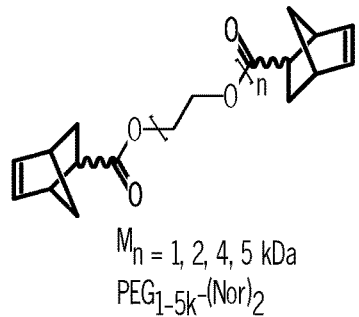
$M_n = 1, 2, 4, 5$ kDa
$PEG_{1-5k}-(Nor)_2$
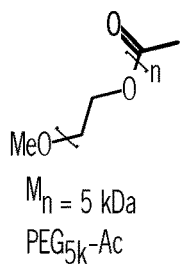
$M_n = 5$ kDa
$PEG_{5k}-Ac$
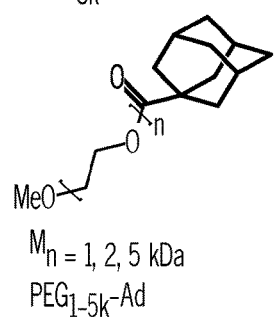
$M_n = 1, 2, 5$ kDa
$PEG_{1-5k}-Ad$
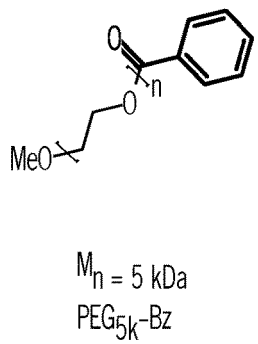
$M_n = 5$ kDa
$PEG_{5k}-Bz$
FIG. 2C1
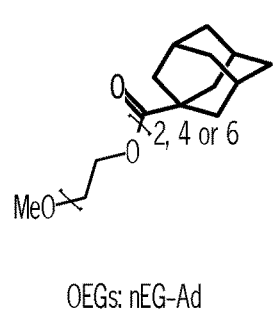
OEGs: nEG-Ad
FIG. 2C2
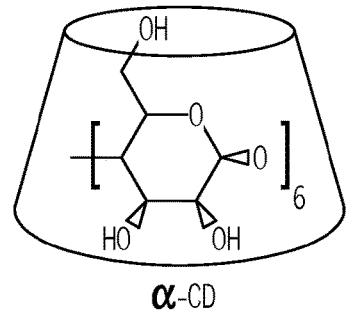
α-CD
FIG. 2C3

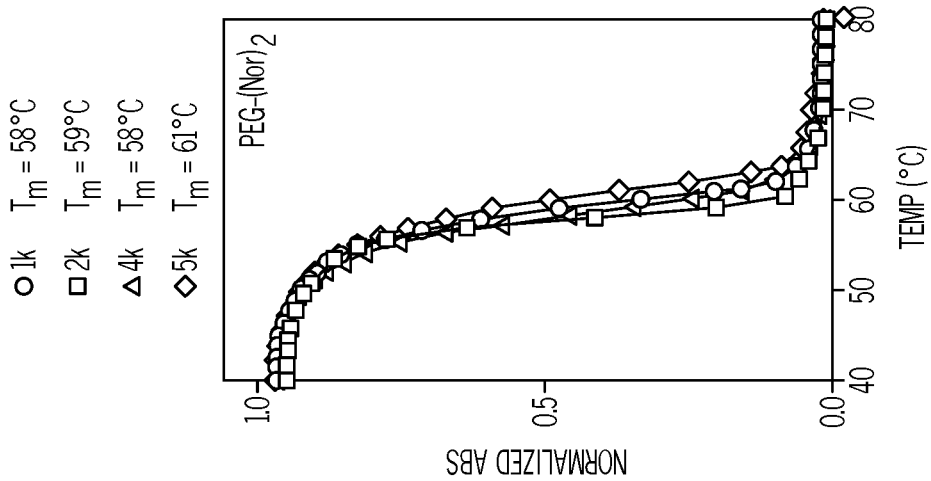
FIG. 4E3
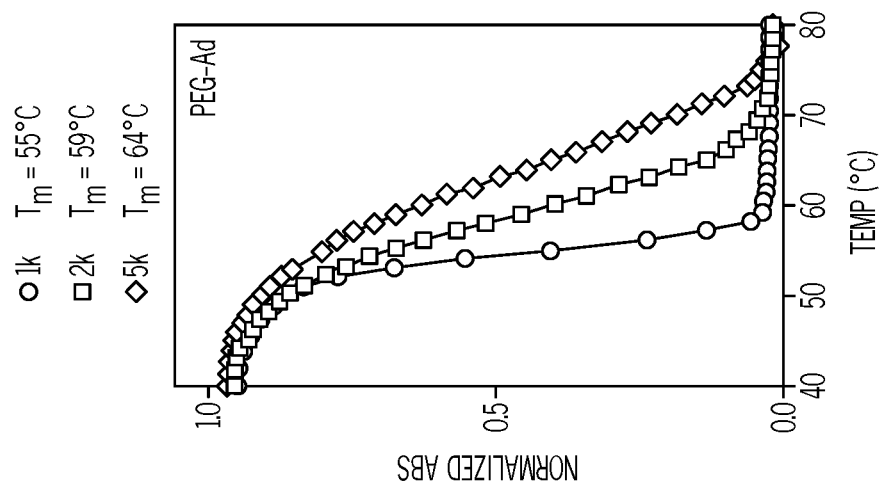
FIG. 4E2
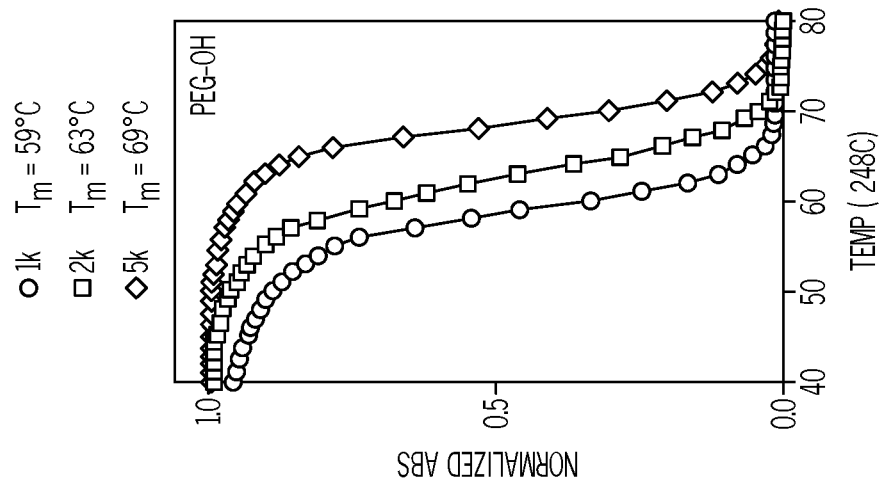
FIG. 4E1

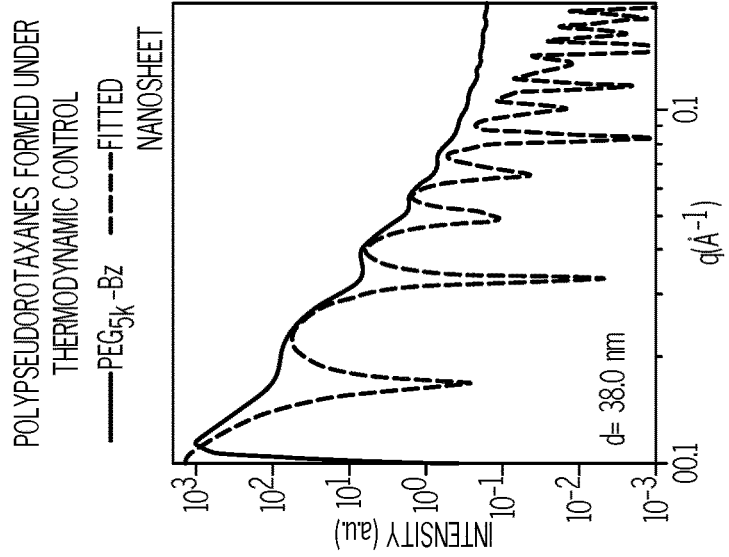
FIG. 6C3
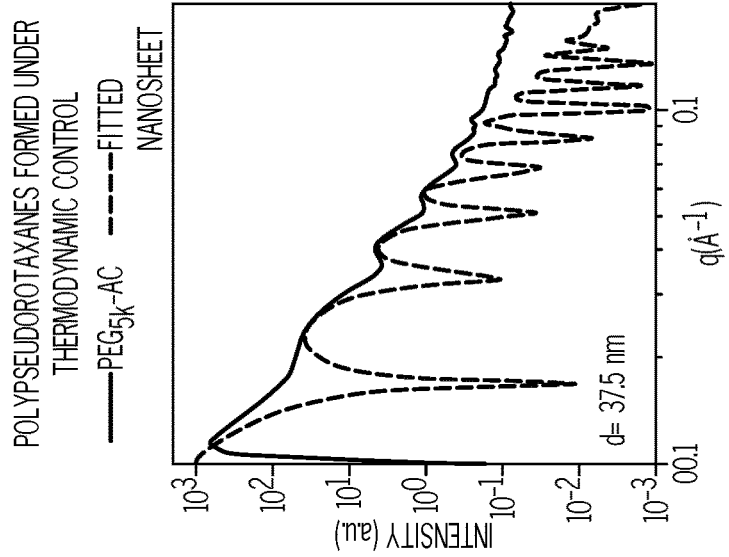
FIG. 6C2
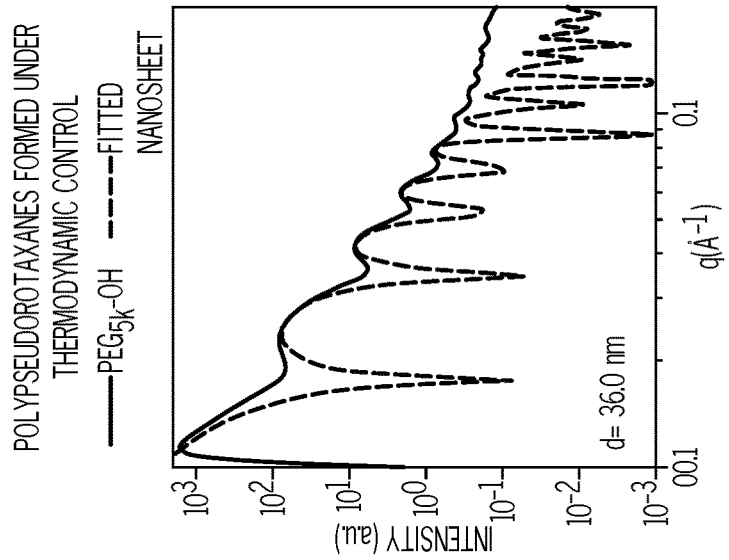
FIG. 6C1

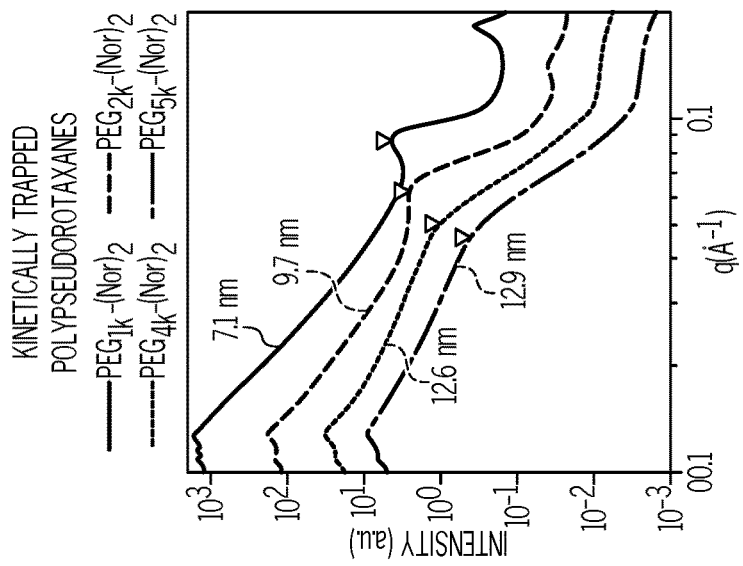
FIG. 6C6
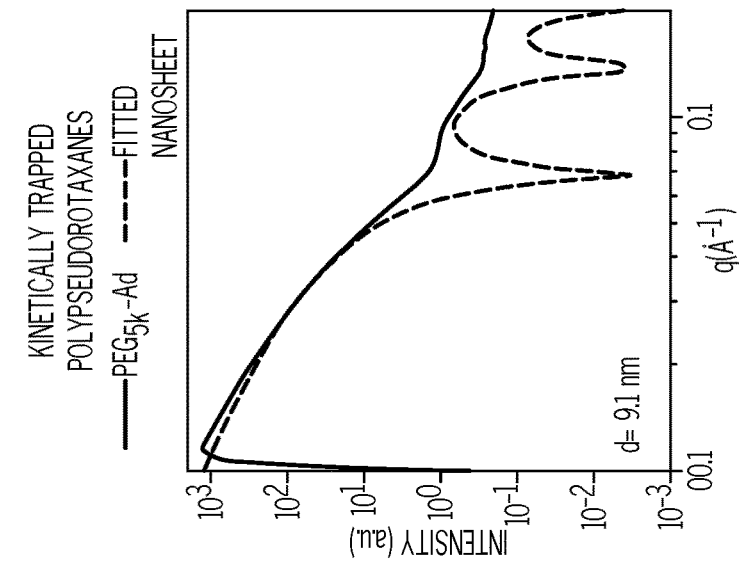
FIG. 6C5
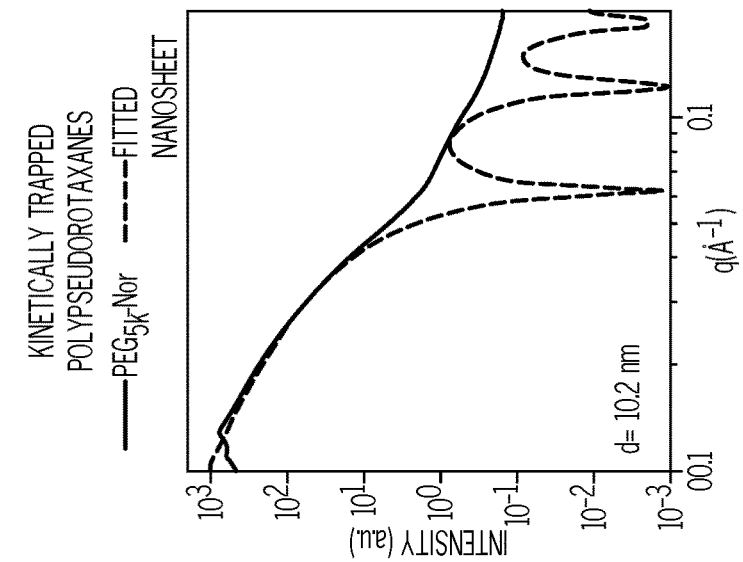
FIG. 6C4

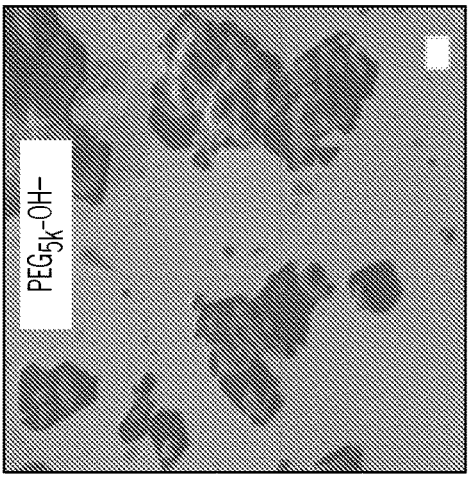
FIG. 6D1
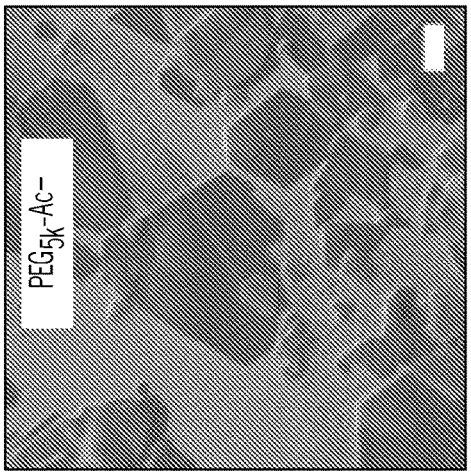
FIG. 6D2
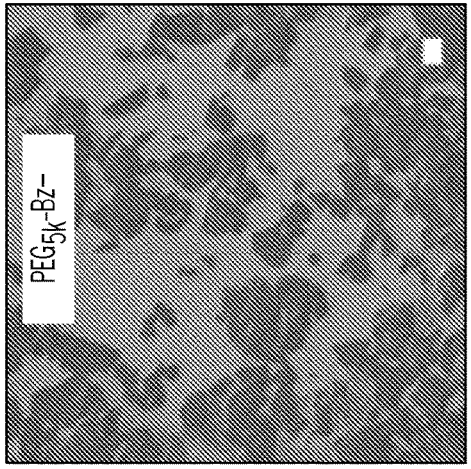
FIG. 6D3
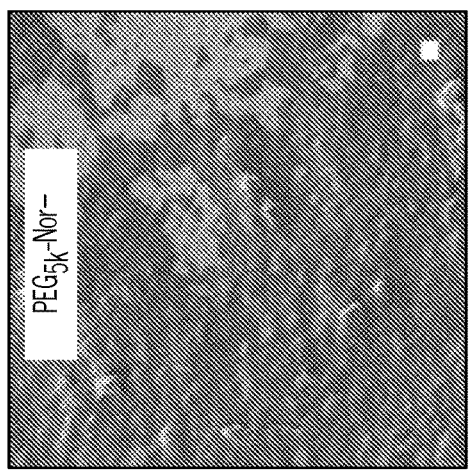
FIG. 6D4
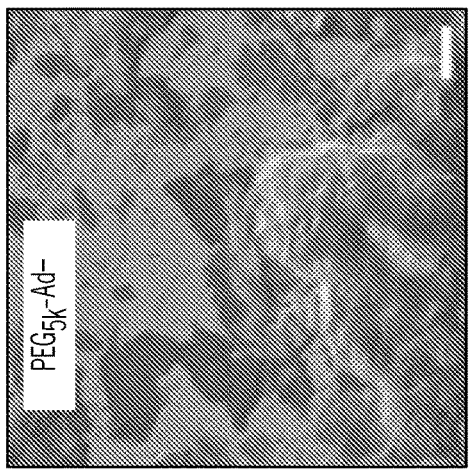
FIG. 6D5
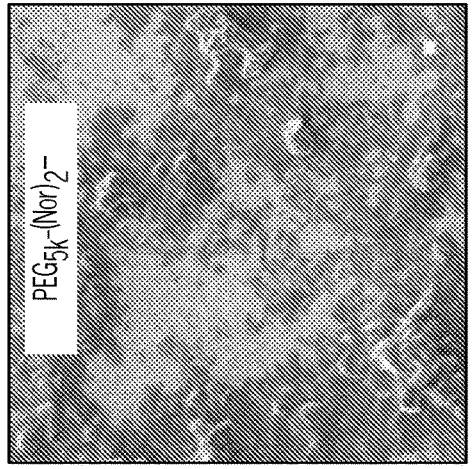
FIG. 6D6

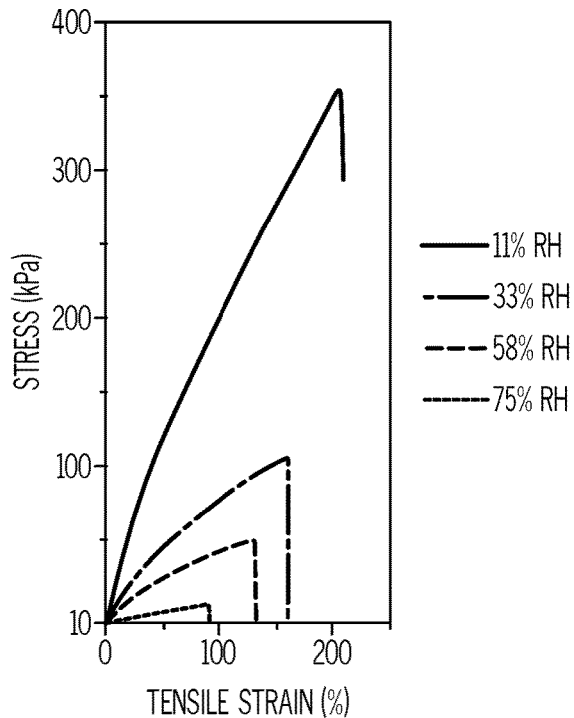
FIG. 8A1
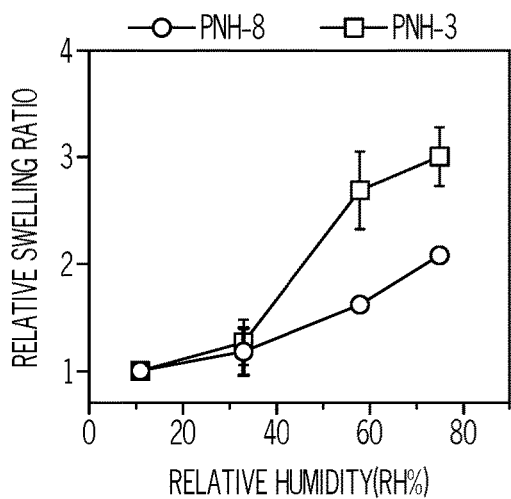
FIG. 8A2
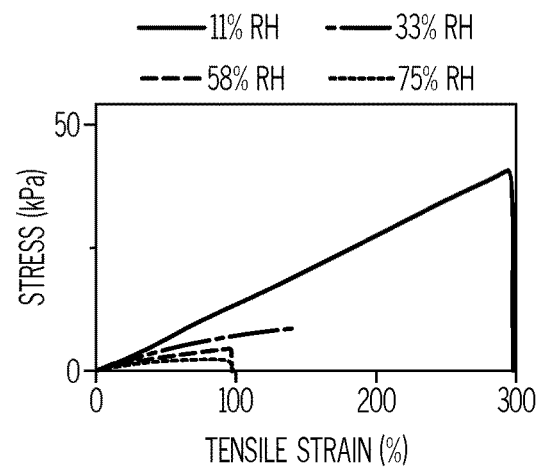
FIG. 8A3

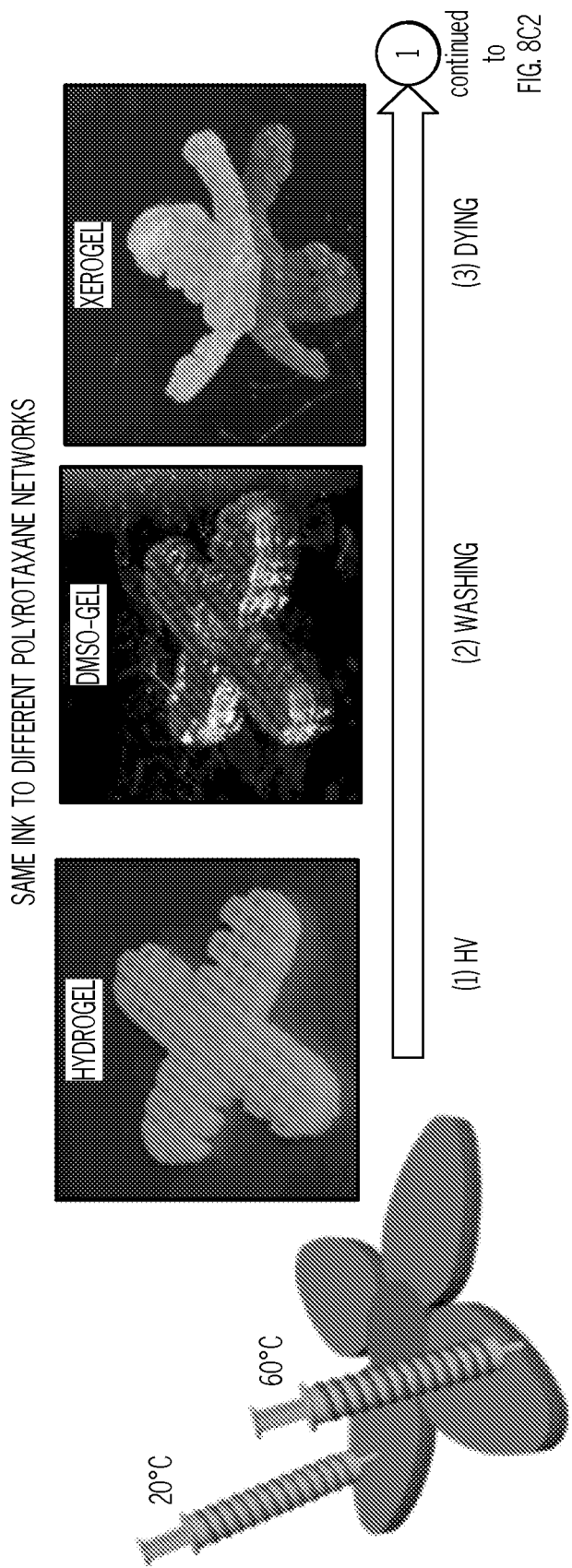
FIG. 8C1

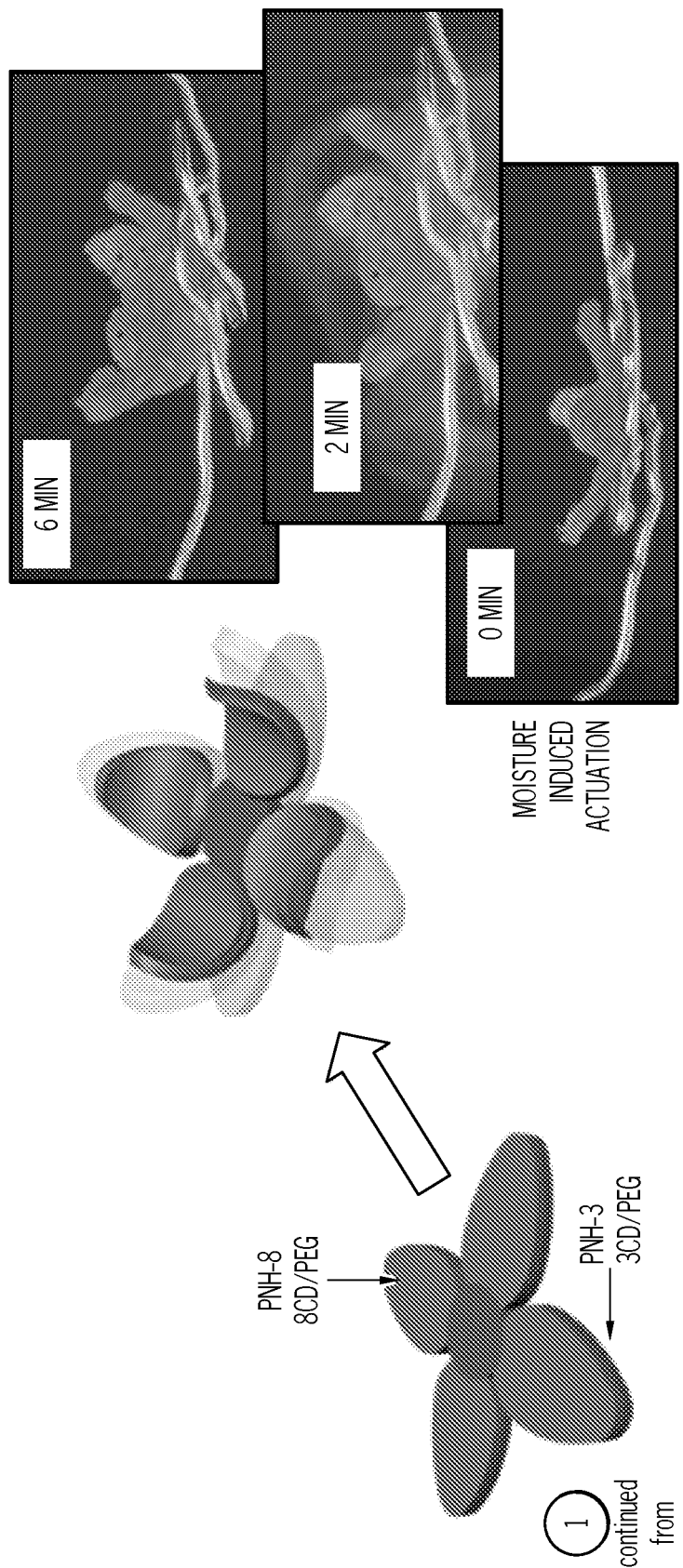
FIG. 8C2

CYCLODEXTRIN-BASED POLYROTAXANES AND PROTEIN HYBRIDS AS THREE-DIMENSIONAL PRINTING INKS

CROSS-REFERENCE TO RELATED APPLICATIONS

This application claims priority to U.S. Provisional Patent Application No. 63/021,971, filed on May 8, 2020. The entirety of the aforementioned application is incorporated herein by reference.

BACKGROUND

Current rotaxanes have numerous limitations in terms of optimal fabrication and ability to be used for three-dimensional (3D) printing. Various embodiments of the present disclosure address the aforementioned limitations.

SUMMARY

In some embodiments, the present disclosure pertains to a composition that includes a rotaxane. In some embodiments, the rotaxane includes a plurality of macrocyclic rings and a polymer. The plurality of macrocyclic rings are threaded onto the polymer through the cavities of the macrocyclic rings. In some embodiments, the plurality of threaded macrocyclic rings include a plurality of different segments of threaded macrocyclic rings. In some embodiments, each of the plurality of different segments is in the form of a crystalline network.

In some embodiments, the polymer has a molecular weight below 10,000 Da. In some embodiments, the polymer is covalently appended to one or more sterically hindered molecules.

Additional embodiments of the present disclosure pertain to methods of forming the rotaxanes of the present disclosure by covalently appending one or more sterically hindered molecules onto a polymer and threading a plurality of macrocyclic rings onto the polymer. Further embodiments of the present disclosure pertain to methods of manufacturing a three-dimensional structure by applying the compositions of the present disclosure onto a surface to result in the formation of the three-dimensional structure on the surface.

DESCRIPTION OF THE DRAWINGS

FIGS. 2A-2C provide a comparison between conventional crystalline polypseudorotaxane formation and the concerted kinetic formation of polypseudorotaxane networks via threading-and-crystallization path. FIGS. 2A-B provide energy barriers and graphical representation of the conventional polypseudorotaxanes formation under thermodynamic control (FIG. 2A), and the concerted kinetic formation of meta-stable polypseudorotaxane networks (FIG. 2B). The decelerated threading and translocation of alpha cyclodextrins (α-CDs) on the polyethylene glycol (PEG) axle stabilized the otherwise transient polypseudorotaxanes with segmented α-CD blocks, which enabled a new path for kinetic micro-crystallization. FIGS. 2C-1, 2C-2, and 2C-3 show PEGs and oligoethylene glycols (nEG-Ad) employed for the formation of α-CD-based polypseudorotaxanes.

FIGS. 4A-4F illustrate kinetic investigations of the threading and translocation of α-CDs on polymer axles and the crystallization of polypseudorotaxanes. FIG. 4A illustrates time-dependent transmittance of the reactions of α-CD (50 mM, 100 mM for $PEG_{5k}$-$(Nor)_2$) and $PEG_{5k}$ (1 mM, 2 mM for $PEG_{5k}$-$(Nor)_2$) with different end groups at 20° C. l=10 mm, λ=550 nm. FIG. 4B shows $^1$H NMR analysis of the threaded α-CDs per PEG at different times, and the measured yields of the polypseudorotaxanes. FIGS. 4C-1 and 4C-2 show time-dependent transmittance and time-normalized transmittance (right) of the reaction of α-CDs (50 mM) with $PEG_{1-5k}$-OH, and $PEG_{1-5k}$-Ad at 20° C., $PEG_{1k}$, $PEG_{2k}$, and $PEG_{5k}$ concentrations of 5, 2.5, and 1 mM, respectively, at 20° C. FIG. 4D shows time-dependent transmittances of the reactions of α-CD (50 mM) and $PEG_{5k}$-Ad (1 mM) measured at different temperatures. FIGS. 4E-1, 4E-2 and 4E-3 show temperature-dependent melting profiles and calculated $T_m$ of polypseudorotaxane aggregates formed by α-CD/$PEG_{1-5k}$-OH, α-CD/$PEG_{1-5k}$-Ad, and α-CD/$PEG_{1-5k}$-$(Nor)_2$. Heating rate: 1° C./min. l=2 mm. FIG. 4F shows melting profiles of a α-CD/$PEG_{5k}$-Ad polypseudorotaxane hydrogel in its as-prepared form (black), 60° C. fast annealed (red) and slow annealed (blue) forms. l=1 mm. Samples were diluted by half to $PEG_{5k}$-Ad (1 mM) and α-CD (50 mM) for measurements. Inset: fitted $T_m$.

FIG. 5A shows elastic moduli of polypseudorotaxane hydrogels measured by angular frequency sweeps. Hydrogels were prepared by mixing α-CD (67 to 330 mM) and $PEG_{5k}$-R (8 mM) at listed EG/α-CD ratios. FIG. 5B shows step-strain rheological profiles of polypseudorotaxane hydrogels composed of $PEG_{5k}$-OH/α-CD and $PEG_{5k}$-Ad/α-CD at an EG/α-CD ratio of 4:1. Alternating 0.1% and 100% strain were applied to the sample every 15 s.

FIGS. 6A-6D show structural and morphological analyses of α-CD/PEG Polypseudorotaxanes. FIG. 6A shows single-crystal structures of two polymorphs of polypseudorotaxane $PEG_{600}$-$(OH)_2$/6(α-CD) and $[(EG)_4/2(α-CD)]_n$. α-CDs were color-coded to represent different symmetry equivalences. FIG. 6B shows WAXS profiles of the hydrogels formed by different α-CD/PEG polypseudorotaxanes, the crystal sample of $PEG_{600}$-$(OH)_2$/α-CD, and the simulated of $PEG_{600}$-$(OH)_2$/6(α-CD) and $[(EG)_4/2(α-CD)]_n$. FIGS. 6C-1, 6C-2, 6C-3, 6C-4, 6C-5, and 6C-6 show SAXS profiles (solid line) of the hydrogels formed by different α-CD/PEG polypseudorotaxanes (EG/α-CD=3.3:1), and their fitted curve (dotted line) and thickness. Polypseudorotaxanes are fitted to hexagonal sheet-like form factor, and α-CD/PEG-$(Nor)_2$ polypseudorotaxanes are fitted to lamellar form factor. FIGS. 6D-1, 6D-2, 6D-3, 6D-4, 6D-5, and 6D-6 show SEM images of the hydrogels formed by different α-CD/PEG polypseudorotaxanes, scale bar: 1 µm.

FIG. 7A shows temperature-triggered diverged formation of polyrotaxane network hydrogel (PNH)-3 and PNH-8 after 3D-printing and photo-crosslinking. FIG. 7B shows temperature-dependent elastic (black), loss moduli (blue) and viscosity (green) of ink-1, heating and cooling rates set as 3 and 20° C./min. FIG. 7C shows as-printed hydrogels and their covalently crosslinked polyrotaxane monoliths. FIG. 7D shows wide angle X-ray diffraction (WAXS) profiles of hydrogels $PEG_{4k}$-$(Nor)_2$/α-CD, ink-1, PNH-3, and PNH-8. FIG. 7E shows tensile stress measurements of PNHs, rate: 0.1 mm/s. Inset: PNHs upon elongation and pencil penetration. PNH-0 was synthesized in a dimethylformide (DMF) solution in the absence of α-CD.

FIGS. 8A-8C show 3D-printed heterogeneous polyrotaxane actuators and their moisture-responsive shape morphing behaviors. FIGS. 8A-1, 8A-2, and 8A-3 show tensile stress measurements of PNH hydrogels equilibrated at different relative humidity (11, 33, 58 and 75%), respectively. Rate: 0.1 mm/s. Inset: relative swelling ratios of PNHs at different relative humidity. FIG. 8B shows designed dual-material actuator models (top), the fabricated (3D-printing followed by crosslinking and washing) heterogeneous hydrogels at relative humidity 11% (middle), and their morphed shapes in the chamber of relative humidity=58% (bottom). These heterogeneous hydrogels were fabricated using identical ink-1 printed at 20° C. (green) and 60° C. (red), respectively. FIGS. 8C-1 and 8C-2 show 3D fabrication of a flower model using ink-1 printed at 20° C. (green) and 60° C. (red) followed by crosslinking. The afforded polyrotaxane flower demonstrated folding motions upon moistening due to the spatial integration of PNH-3 and PNH-8 at the top and bottom layers.

DETAILED DESCRIPTION

Figure 1A:
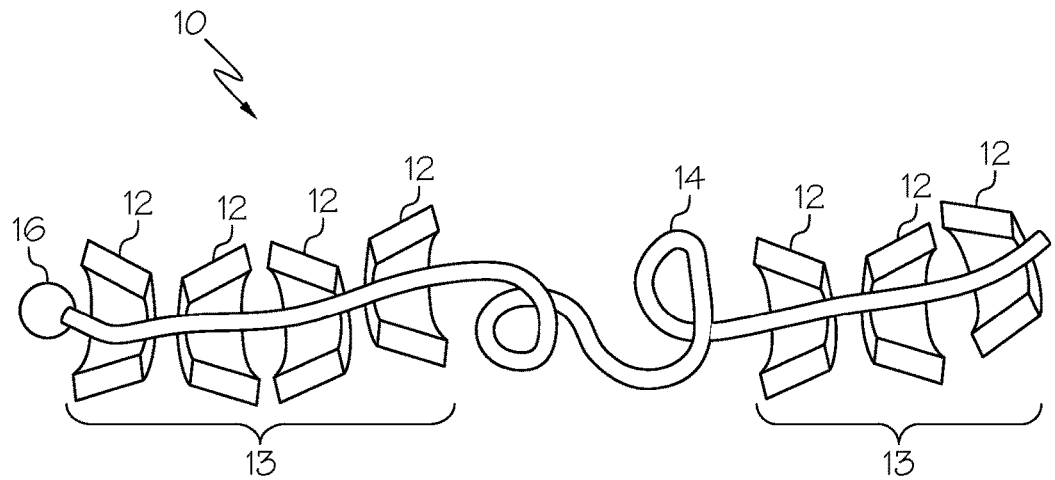
FIG. 1A provides an illustration of a rotaxane of the present disclosure.

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Rotaxanes have numerous applications, including applications in three-dimensional (3D) printing. However, current rotaxanes have numerous limitations in terms of fabrication and properties optimal for 3D printing. For instance, the synthesis of cyclodextrin-based three-dimensional (3D)—printable polypseudorotaxanes, which are formed by threading α-cyclodextrins (α-CDs) onto linear polyethylene glycol (PEG), requires the use of high molecular weight PEG with a minimal molecular weight of 10 k Pa. In particular, shorter PEGs ($10000>M_n>400$) form brittle hydrogels or crystalline precipitates that do not possess the suitable shear-thinning and self-healing properties for 3D printing.

Accordingly, a need exists for rotaxane-based compositions that possess suitable properties for 3D printing. A need also exists for rotaxane-based compositions that can be fabricated in a facile manner, and without the need for the use of long-chain polymers. Various embodiments of the present disclosure address the aforementioned needs.

In some embodiments, the present disclosure pertains to compositions that include a rotaxane. The rotaxane generally includes: (1) a plurality of macrocyclic rings, where each of the plurality of macrocyclic rings includes a cavity; and (2) a polymer. The macrocyclic rings are threaded onto the polymer through the cavities of the macrocyclic rings. Additionally, the polymer is covalently appended to one or more sterically hindered molecules. In additional embodiments, the rotaxanes of the present disclosure are also covalently appended to one or more macromolecules, such as cysteine-rich proteins.

In some embodiments, the polymers of the rotaxanes of the present disclosure have a molecular weight below 10,000 Da. In some embodiments, the plurality of threaded macrocyclic rings include a plurality of different segments of threaded macrocyclic rings. In some embodiments, each of the plurality of different segments is in the form of a crystalline network.

In a specific embodiment illustrated in FIG. 1A, the compositions of the present disclosure include rotaxane 10. In this embodiment, rotaxane 10 includes polymer 14, a plurality of macrocyclic rings 12 with cavities that are threaded onto polymer 14, and sterically hindered molecules 16 that are covalently appended to polymer 14. In this embodiment, the macrocyclic rings 12 form a plurality of different segments 13. Additionally, the macrocyclic rings 12 in this embodiment are interlocked with polymer 14 through sterically hindered molecules 16.

Figure 1B:
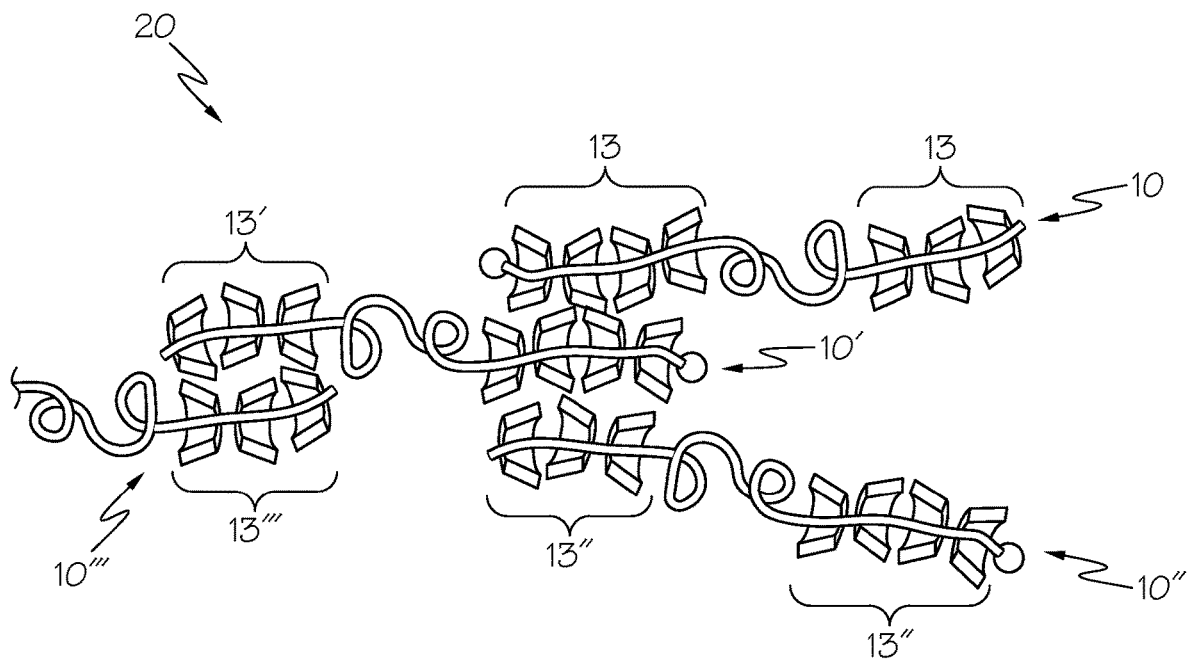
FIG. 1B provides a second illustration of a rotaxane of the present disclosure.

In another specific embodiment illustrated in FIG. 1B, the compositions of the present disclosure include composition 20, which includes a plurality of rotaxanes 10. Each rotaxane 10 in this embodiment includes a plurality of different segments 13, where each segment includes threaded macrocyclic rings. In this embodiment, rotaxanes 10 are associated with one another through the parallel association of their segments 13.

Figure 1C:
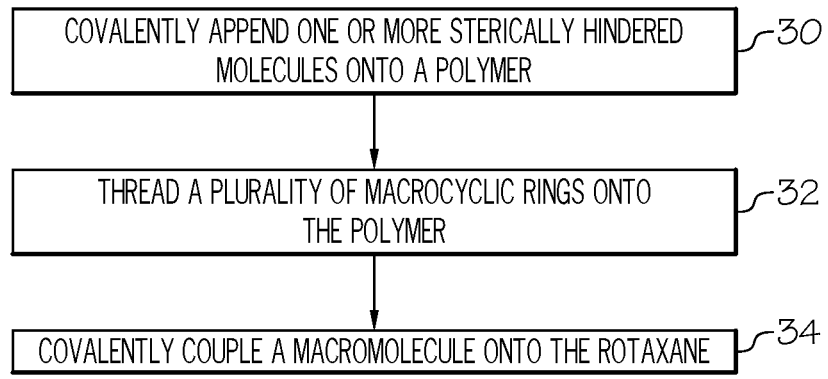
FIG. 1C provides a scheme of a method of making rotaxane-based compositions of the present disclosure.

Additional embodiments of the present disclosure pertain to methods of forming the compositions of the present disclosure. In some embodiments illustrated in FIG. 1C, the methods of the present disclosure include: covalently appending one or more sterically hindered molecules onto a polymer (step 30); and threading a plurality of macrocyclic rings onto the polymer (step 32). In additional embodiments that are also illustrated in FIG. 1C, the methods of the present disclosure also include a step of covalently coupling a macromolecule onto the rotaxane (step 34).

Figure 1D:
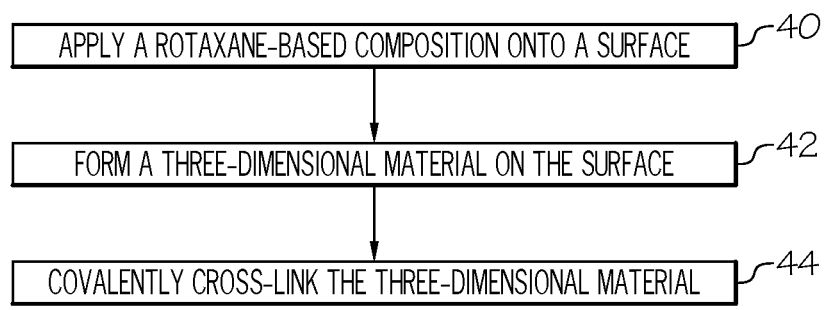
FIG. 1D provides a scheme of a method of manufacturing three-dimensional structures from the rotaxane-based compositions of the present disclosure.

Further embodiments of the present disclosure pertain to methods of manufacturing a three-dimensional structure. In some embodiments illustrated in FIG. 1D, the methods of the present disclosure include applying a composition of the present disclosure onto a surface (step 40) to result in the formation of the three-dimensional structure on the surface (step 42). In additional embodiments, the methods of the present disclosure also include a step of covalently cross-linking the three-dimensional structure (step 44), such as through photo-irradiation.

As set forth in more detail herein, the methods and compositions of the present disclosure can have numerous embodiments. For instance, the rotaxanes of the present disclosure can include numerous macrocyclic rings, polymers, sterically hindered molecules, and macromolecules. Moreover, the compositions of the present disclosure can have various forms and properties. Additionally, various methods may be utilized to make the compositions of the present disclosure and utilize them for the formation of three-dimensional materials.

Macrocyclic Rings

Macrocyclic rings generally include macromolecules that are in the form of ring structures with a cavity portion. The rotaxanes of the present disclosure can include numerous macrocyclic rings. For instance, in some embodiments, the macrocyclic rings include cyclic oligosaccharides or a derivative thereof. In some embodiments, the macrocyclic rings include cyclodextrins, cyclodextrin derivatives, or combinations thereof.

In some embodiments, the macrocyclic rings include cyclodextrins. In some embodiments, the cyclodextrins include, without limitation, α-cyclodextrin (α-CD), β-cyclodextrin (β-CD), γ-cyclodextrin (γ-CD), derivatives thereof, or combinations thereof. In some embodiments, the macrocyclic rings include α-cyclodextrins.

Numerous numbers of macrocyclic rings may be threaded onto a polymer. For instance, in some embodiments, at least about 15 macrocyclic rings are threaded onto a polymer. In some embodiments, at least about 25 macrocyclic rings are threaded onto a polymer. In some embodiments, at least about 30 macrocyclic rings are threaded onto a polymer. In some embodiments, at least about 35 macrocyclic rings are threaded onto a polymer. In some embodiments, at least about 40 macrocyclic rings are threaded onto a polymer. In some embodiments, about 15-28 macrocyclic rings are threaded onto a polymer.

In some embodiments, less than about 15 macrocyclic rings are threaded onto a polymer. In some embodiments, about 5 to about 15 macrocyclic rings are threaded onto a polymer.

Segments

In some embodiments, the threaded macrocyclic rings include a plurality of different segments. In some embodiments, each of the plurality of different segments includes a plurality of threaded macrocyclic rings. In some embodiments, each of the plurality of different segments includes a different number of threaded macrocyclic rings. In some embodiments, each of the plurality of different segments is in the form of a crystalline network.

In some embodiments, the threaded macrocyclic rings in each of the different segments includes hydrogen bonds between the threaded macrocyclic rings and hydrogen bonds between the threaded macrocyclic rings and the polymer. In some embodiments, the threaded macrocyclic rings in each of the segments include covalent linkages between the threaded macrocyclic rings. In some embodiments, the threaded macrocyclic rings in each of the different segments include covalent linkages between the threaded macrocyclic rings and the polymer.

Polymer

The rotaxanes of the present disclosure can also include numerous polymers. For instance, in some embodiments, the polymers include, nonionic amphiphilic polymers. In some embodiments, the nonionic amphiphilic polymers include, without limitation, polyethylene glycol (PEG), poly(propylene oxide), polyalkyl ethers, and combinations thereof. In some embodiments, the polymers of the present disclosure include polyethylene glycol (PEG).

In some embodiments, the polymers of the present disclosure are in the form of copolymers. In some embodiments, the polymers of the present disclosure are in the form of homopolymers.

The polymers of the present disclosure can be in various forms. For instance, in some embodiments, the polymers of the present disclosure are in linear form. In some embodiments, the polymers of the present disclosure are in branched form. In some embodiments, the polymers of the present disclosure are in cross-linked form. In some embodiments, the polymers of the present disclosure are in the form of a network.

The polymers of the present disclosure can have various sizes. For instance, in some embodiments, the polymers of the present disclosure have a molecular weight below 10,000 Da. In some embodiments, the polymers of the present disclosure have a molecular weight between about 10,000 Da and about 400 Da. In some embodiments, the polymers of the present disclosure have a molecular weight between about 6,000 Da and about 400 Da. In some embodiments, the polymers of the present disclosure have a molecular weight between about 5,000 Da and about 400 Da. In some embodiments, the polymers of the present disclosure have a molecular weight of about 2,000 Da. In some embodiments, the polymers of the present disclosure have a molecular weight between about 1,000 Da and about 400 Da. In some embodiments, the polymers of the present disclosure have a molecular weight of about 400 Da. In some embodiments, the polymers of the present disclosure have a molecular weight between about 1,000 Da and about 10,000 Da.

Sterically Hindered Molecules

The polymers of the present disclosure may be appended to various sterically hindered molecules. For instance, in some embodiments, the sterically hindered molecules of the present disclosure have a bulky structure that provides steric hindrance. In some embodiments, the structures include, without limitation, one or more of the following structures:

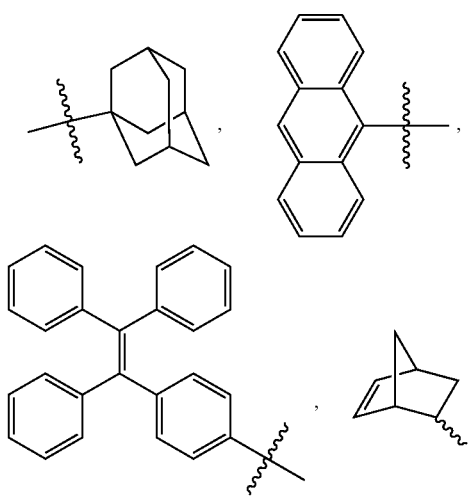

-continued

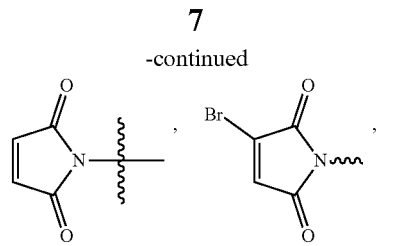

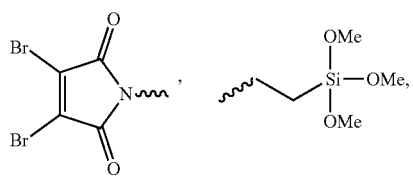

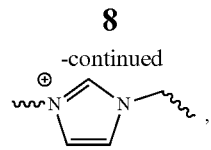

derivatives thereof, or combinations thereof.

In some embodiments, the sterically hindered molecules of the present disclosure have a photo-switch. In some embodiments, the photo-switch couples with the macrocyclic rings of the present disclosure. An example of a photo-switch that couples with alpha cyclodextrin is illustrated herein:

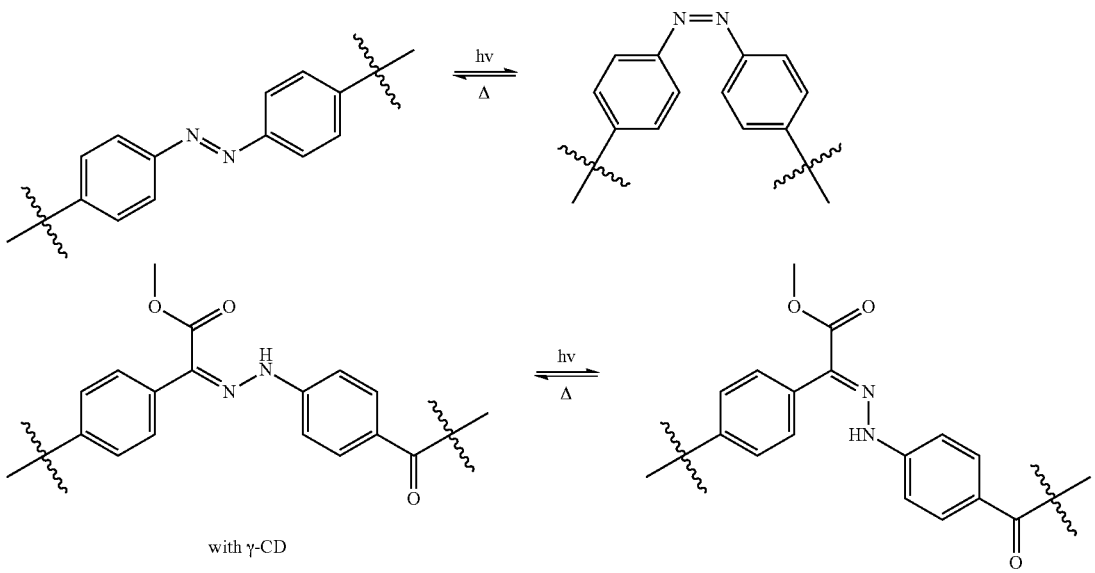

with γ-CD

-continued

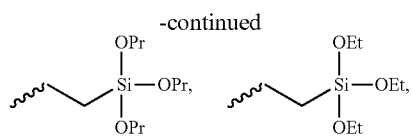

derivatives thereof, or combinations thereof.

In some embodiments, the sterically hindered molecules of the present disclosure have a charged structure. In some embodiments, the charged structure includes, without limitation, one or more of the following structures:

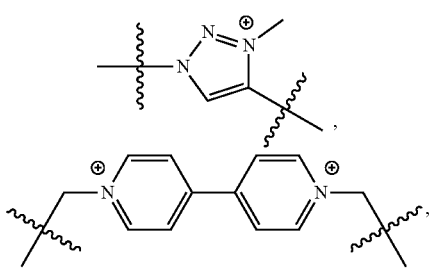

In some embodiments, the sterically hindered molecules of the present disclosure are in the form of a mechanophore. In some embodiments, the mechanophore includes, without limitation, one or more of the following structures:

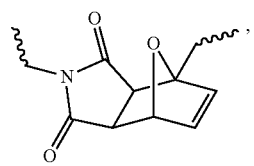

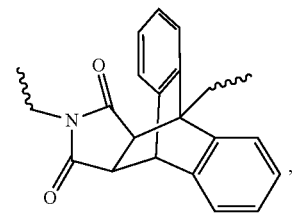

derivatives thereof, or combinations thereof.

The sterically hindered molecules of the present disclosure may also have various groups. For instance, in some embodiments, the sterically hindered molecules of the present disclosure may have olefin groups. In some embodiments, the sterically hindered molecules of the present disclosure may have aliphatic groups. In some embodiments, the sterically hindered molecules of the present disclosure may have aromatic groups.

In some embodiments, the one or more sterically hindered molecules include, without limitation, cycloalkanes, cyclohexanes, camphors, adamantanes, norbornanes, bornanes, derivatives thereof, and combinations thereof.

In some embodiments, the one or more sterically hindered molecules include adamantanes. In some embodiments, the one or more sterically hindered molecules include adamantane derivatives. In some embodiments, the adamantane derivatives include adamantylester (-Ad).

In some embodiments, the one or more sterically hindered molecules include norbornanes. In some embodiments, the one or more sterically hindered molecules include norbornane derivatives. In some embodiments, the norbornane derivatives include norbonylester (-Nor).

In some embodiments, the sterically hindered molecules of the present disclosure are different from the macrocyclic rings of the present disclosure. In some embodiments, the sterically hindered molecules of the present disclosure are different from the macromolecules of the present disclosure.

The polymers of the present disclosure may be appended to various numbers of sterically hindered molecules. For instance, in some embodiments, the polymers of the present disclosure are appended to a single sterically hindered molecule. In some embodiments, the polymers of the present disclosure are appended to a plurality of sterically hindered molecules.

The polymers of the present disclosure may also be appended to sterically hindered molecules in various arrangements. For instance, in some embodiments, a plurality of sterically hindered molecules are appended to a polymer such that the plurality of macrocyclic rings are between the plurality of sterically hindered molecules. In some embodiments, each end of the polymer is covalently appended to a sterically hindered molecule.

In some embodiments, one or more sterically hindered molecule may be appended to a region between ends of a polymer. In some embodiments, one or more sterically hindered molecule may be appended to a middle region of a polymer.

In some embodiments, the one or more sterically hindered molecules interlock the plurality of macrocyclic rings with the polymer. In some embodiments, the one or more sterically hindered molecules partition the plurality of macrocyclic rings in each segment.

The sterically hindered molecules of the present disclosure can have various effects on the compositions of the present disclosure. For instance, in some embodiments, the sterically hindered molecules of the present disclosure lower the energy barrier of the composition when compared to a composition that lacks the sterically hindered molecules.

Macromolecules

In some embodiments, the rotaxanes of the present disclosure may also be associated with macromolecules. In some embodiments, the macromolecules include, without limitation, peptides, proteins, peptoids, thiol-containing molecules, and combinations thereof. In some embodiments, the macromolecules include cysteine-rich proteins, such as bovine serum albumin.

In some embodiments, the macromolecules of the present disclosure include thiol-containing molecules. In some embodiments, the thiol-containing molecules include thiol-ene cross-linkers, such as tetrathiol cross-linkers.

In some embodiments, the macromolecules of the present disclosure are different from the sterically hindered molecules of the present disclosure. In some embodiments, the macromolecules of the present disclosure are different from the macrocyclic rings of the present disclosure.

The rotaxanes of the present disclosure may be associated with macromolecules in various manners. For instance, in some embodiments, the rotaxanes of the present disclosure may be covalently coupled to macromolecules. In some embodiments, the rotaxanes of the present disclosure may be covalently coupled to macromolecules through a covalent bond between the macromolecule and a sterically hindered molecule. In some embodiments, the covalent bond between the macromolecule and the sterically hindered molecule includes a sulfide bond.

Composition Forms

The rotaxane-based compositions of the present disclosure may be in various forms. For instance, in some embodiments, the compositions of the present disclosure are in the form of hydrogels. In some embodiments, the compositions of the present disclosure are in the form of viscoelastic hydrogels. In some embodiments, the compositions of the present disclosure are in the form of a supramolecular polypseudorotaxane hydrogels.

In some embodiments, the compositions of the present disclosure are in 3-D printable form. For instance, in some embodiments, the compositions of the present disclosure have a viscosity which allows for 3-D printing of the composition to form a 3-D structure. In some embodiments, the compositions of the present disclosure are capable of reversible 3-D structural deformation.

In some embodiments, the compositions of the present disclosure are in the form of a crystalline network. In some embodiments, the crystalline network includes a hexagonal structure.

In some embodiments, the compositions of the present disclosure include a plurality of rotaxanes. In some embodiments, the rotaxanes are associated with one another through the association of their segments. For instance, in some embodiments, the segments are associated in a parallel direction. In some embodiments, the association of the segments forms a hierarchical structure. In some embodiments, the association of the segments forms a polymorphic structure.

Properties

The compositions of the present disclosure can have various advantageous properties. For instance, in some embodiments, the compositions of the present disclosure have an elastic modulus of more than 1,000 Pa. In some embodiments, the compositions of the present disclosure have an elastic modulus of more than 1,500 Pa. In some embodiments, the compositions of the present disclosure have an elastic modulus of more than 2,000 Pa. In some embodiments, the compositions of the present disclosure have an elastic modulus of more than 2,500 Pa. In some embodiments, the compositions of the present disclosure have an elastic modulus of more than 3,000 Pa. In some embodiments, the compositions of the present disclosure have an elastic modulus of more than 3,500 Pa. In some embodiments, the compositions of the present disclosure have an elastic modulus of more than 4,000 Pa.

In some embodiments, the compositions of the present disclosure have an elastic modulus of more than 10,000 Pa. In some embodiments, the compositions of the present disclosure have an elastic modulus of more than 15,000 Pa. In some embodiments, the compositions of the present disclosure have an elastic modulus of more than 20,000 Pa.

In some embodiments, the compositions of the present disclosure have an elastic modulus of more than 25,000 Pa. In some embodiments, the compositions of the present disclosure have an elastic modulus of more than 30,000 Pa. In some embodiments, the compositions of the present disclosure have an elastic modulus of more than 35,000 Pa. In some embodiments, the compositions of the present disclosure have an elastic modulus of at least about $10^6$ Pa. In some embodiments, the compositions of the present disclosure have an elastic modulus of at least about $10^7$ Pa.

Methods of Forming Rotaxane-Based Compositions

Additional embodiments of the present disclosure pertain to methods of forming the rotaxane-based compositions of the present disclosure. In some embodiments, the methods of the present disclosure include: covalently appending one or more sterically hindered molecules onto a polymer, and threading a plurality of macrocyclic rings onto the polymer. In additional embodiments, the methods of the present disclosure also include a step of covalently coupling a macromolecule onto the rotaxane. As set forth in more detail herein, the methods of the present disclosure can also have numerous embodiments.

Threading Macrocyclic Rings onto Polymers

Various methods may be utilized to thread macrocyclic rings onto a polymer. For instance, in some embodiments, the threading occurs by incubating the macrocyclic rings with the polymer in a solution. In some embodiments, the incubating step also includes heating the solution. In some embodiments, the incubating step also includes stirring the solution.

Appending Sterically Hindered Molecules onto Polymers

Various methods may also be utilized to covalently append one or more sterically hindered molecules onto a polymer. For instance, in some embodiments, the covalent appending occurs by incubating the polymer with one or more sterically hindered molecules. In some embodiments, the incubation results in a nucleophilic substitution reaction that leads to the covalent bonding of the one or more sterically hindered molecules onto the polymer.

In some embodiments, the one or more sterically hindered molecules are covalently appended onto a polymer after threading a plurality of macrocyclic rings onto the polymer. In some embodiments, the one or more sterically hindered molecules are covalently appended onto a polymer while threading a plurality of macrocyclic rings onto the polymer. In some embodiments, the one or more sterically hindered molecules are covalently appended onto a polymer before threading a plurality of macrocyclic rings onto the polymer.

Coupling to Macromolecules

Various methods may also be utilized to covalently couple a macromolecule onto the rotaxanes of the present disclosure. For instance, in some embodiments, the covalent coupling occurs by incubating the rotaxane with the macromolecule in a solution. In some embodiments, the incubating includes a step of exposing the solution to light in order to mediate a photo-cross-linking reaction. In some embodiments, the covalent coupling occurs between sterically hindered molecules and the macromolecules. In some embodiments, the covalent coupling occurs through a reaction between a sulfur group of the macromolecule and an olefin group of a sterically hindered molecule to result in the formation of a sulfur bond.

Methods of Manufacturing Three-Dimensional Structures

Additional embodiments of the present disclosure pertain to methods of manufacturing three-dimensional structures. In some embodiments, the methods of the present disclosure include applying a composition of the present disclosure onto a surface to result in the formation of the three-dimensional structure on the surface.

In some embodiments, the methods of the present disclosure also include a step of covalently cross-linking the three-dimensional structure. In some embodiments, the covalent cross-linking occurs through photo-irradiation. In some embodiments, the cross-linking occurs in the presence of one or more of the macromolecules of the present disclosure.

Various methods may be utilized to apply the compositions of the present disclosure onto a surface. For instance, in some embodiments, the applying occurs by additive manufacturing.

Applications and Advantages

The methods and compositions of the present disclosure can provide numerous advantages. For instance, unlike previous 3-D printable polypseudorotaxane hydrogels, which required the molecular weight of polymers to be above 10,000 Da, the compositions of the present disclosure can utilize polymers with lower molecular weights. This in turn allows the compositions of the present disclosure to have broader applications due to better moduli tunability and functional group incorporation.

Moreover, the covalent appendage of sterically hindered molecules onto polymers allows for the methods of the present disclosure to have better control over the macrocyclic ring threading process and rotaxane crystallization process, such as control over the number of threaded macrocyclic rings. This in turn can increase the number of crystalline domains formed in the hydrogel compositions of the present disclosure, thereby resulting in significantly improved viscoelastic properties for successful 3-D printing.

In some embodiments, the 3-D printing process can also improve by the utilization of different sterically hindered molecules on polymers. For instance, in some embodiments, the elastic moduli of the hydrogel compositions of the present disclosure increased up to two orders of magnitude, thereby transforming weak hydrogels to 3-D-printable hydrogels. Moreover, in some embodiments, the fabricated compositions of the present disclosure possessed sufficient compressible moduli that resembled human tissues.

Additionally, the properties of the hydrogel compositions of the present disclosure can be modified in various manners. For instance, in some embodiments, the elastic moduli of the hydrogel compositions of the present disclosure can be modified by changing the concentration of the hydrogel compositions of the present disclosure.

Additionally, the properties of the 3-D printed materials can be modified by changing various conditions. For instance, in some embodiments, the elastic moduli and toughness of the 3-D printed materials of the present disclosure can be modified by changing the temperature of the hydrogel compositions of the present disclosure.

Moreover, 3D printing can occur at various temperatures. For instance, in some embodiments, 3D printing can occur at temperatures of more than about 25° C. In some embodiments, 3D printing can occur at temperatures of more than about 45° C. In some embodiments, 3D printing can occur at temperatures of more than about 55° C. In some embodiments, 3D printing can occur at temperatures of more than about 60° C.

As such, the methods and compositions of the present disclosure can find numerous applications. For instance, in some embodiments, the compositions of the present disclosure can be utilized as tissue engineering scaffolds that can be transplanted into living systems.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Kinetic Trapping of 3D-Printable Poly(Pseudo)Rotaxane Networks

In this Example, Applicant demonstrated a chemical approach to access the meta-stable states of polypseudorotaxanes at the molecular level, navigate their crystallization at the mesoscale, amplify their structural features to the macroscale, and crosslink the monoliths as 3D-printed moisture-responsive actuators. Future development, such as refining polymer axle and end group design, will enable precise control over multiple meta-stable states hierarchically, allowing for the fabrication of fast-responsive actuators and robotics using sustainable energy source like humidity variations.

In particular, Applicant demonstrate in this Example a concerted kinetic trapping design to timely resolve a set of transient polypseudorotaxanes in solution and harness a crop of them via micro-crystallization. By installing stopper or speed bump moieties on the polymer axles, meta-stable polypseudorotaxanes with segmented cyclodextrin blocks were hierarchically amplified into crystalline networks of different crosslinking densities at mesoscale, and viscoelastic hydrogels with 3D-printability at bulk.

Applicant demonstrated simultaneous 3D-printing of two polypseudorotaxane networks from one reactive ensemble, and their conversion to heterogeneous rotaxane monoliths. Spatially programming the macroscale shapes of these heterogeneous rotaxanes enabled the construction of moisture-responsive actuators, in which the shape morphing is originated from the different numbers of cyclodextrins interlocked in these polyrotaxane networks.

Figure 2A:
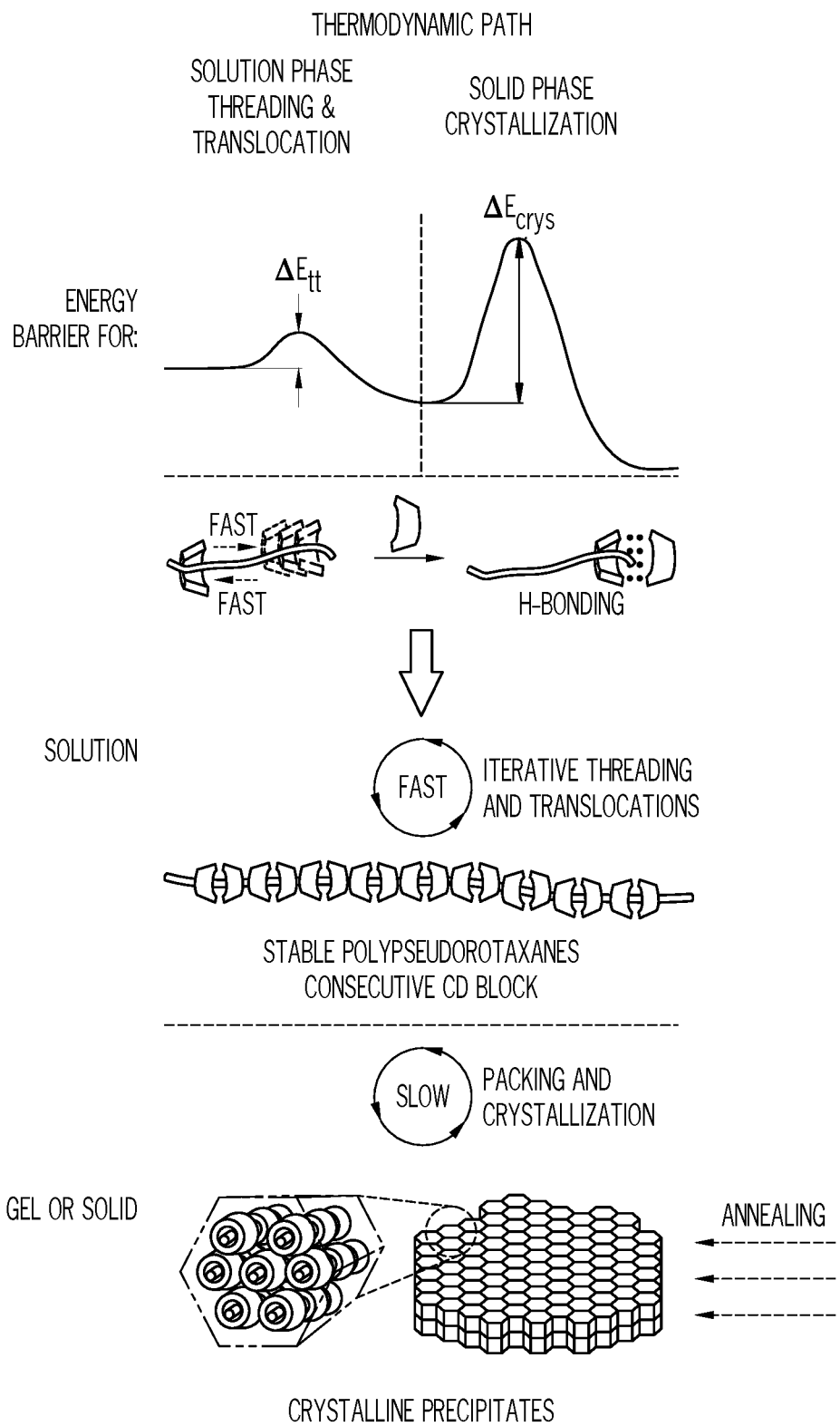

In the exploration of the rational design of meta-stable poly(pseudo)rotaxane materials, Applicant sought to divert the formation and crystallization of $\alpha$-cyclodextrin ($\alpha$-CD) and polyethylene glycol (PEG)-based polypseudorotaxanes away from the thermodynamic path (FIG. 2A). By installing stopper or threading "speed bumps" on the PEG chain end(s), the kinetic energy barriers for the solution-phase polypseudorotaxanes assembly were raised (FIG. 2B).

Figure 2B:
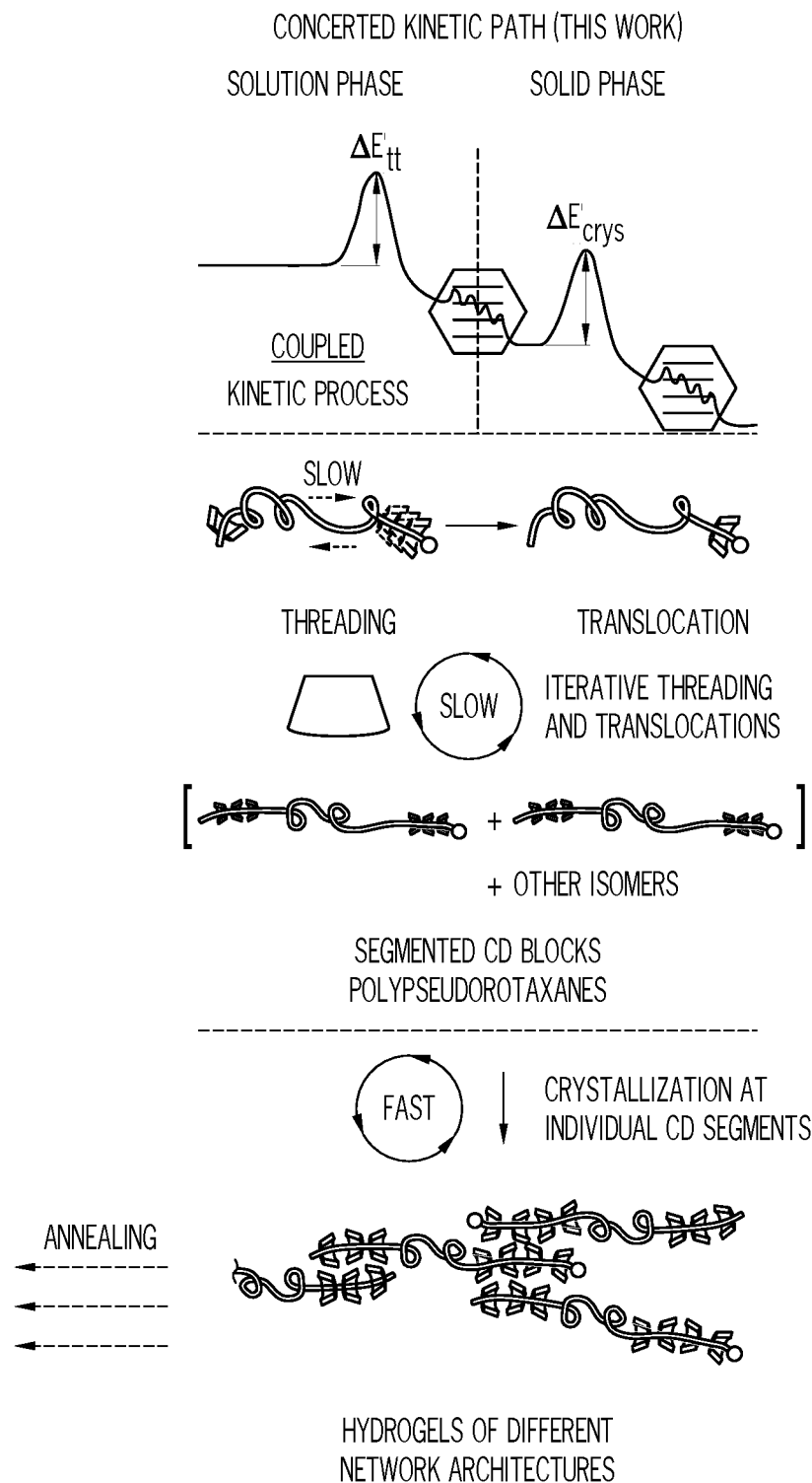

A spectrum of polypseudorotaxanes with segmented $\alpha$-CD blocks (FIGS. 3A-3C) was kinetically resolved and micro-crystallized, following new kinetic crystallization paths with lower energy barriers (FIG. 2B). Applicant discovered that the kinetic solution-phase assembly and micro-crystallization of polypseudorotaxanes is a concerted process, affording meta-stable products as physically crosslinked hydrogels with suitable viscoelasticity for direct-ink-write (DIW) 3D-printing.

By diverging the same reactive ensemble of $PEG_{4k}$-$Nor_2$ and $\alpha$-CD simultaneously into two kinetically trapped polypseudorotaxane hydrogels at two temperatures, Applicant obtained 3D-printed heterogeneous polypseudorotaxane hydrogels with spatially configured shapes and compositions. Applicant permanently fixed these meta-stable polypseudorotaxane networks through post-printing covalent crosslinking, and converted them as polyrotaxane networks. As a result of the different numbers of mechanically interlocked $\alpha$-CDs in each polyrotaxane network, Applicant demonstrated different responsiveness to humidity changes. Applicant demonstrated that, by varying the macroscale 3D-printing designs, the obtained heterogeneous polyrotaxane monoliths exhibited pre-programmed moisture-responsive actuations.

Example 1.1. Molecular Design Considerations

When $\alpha$-CDs are threaded onto a short-to-medium chain PEG (smPEG, $M_n$<6 kDa), the smPEG axle is covered by a tube of consecutively hydrogen-bonded $\alpha$-CDs, forming crystalline polypseudorotaxane precipitates with constant ethylene glycol (EG):$\alpha$-CD molar ratios. These investigations suggested that the threading and translocation energy barriers of $\alpha$-CDs onto smPEGs are small in solution (FIG. 2A), but the energy barrier for polypseudorotaxane crystallization is relatively large (rate determine step). Any kinetic variant of polypseudorotaxane in solution was converged to the stable form before crystallization, thus preventing the isolation of kinetically trapped polypseudorotaxanes.

Figure 3A:
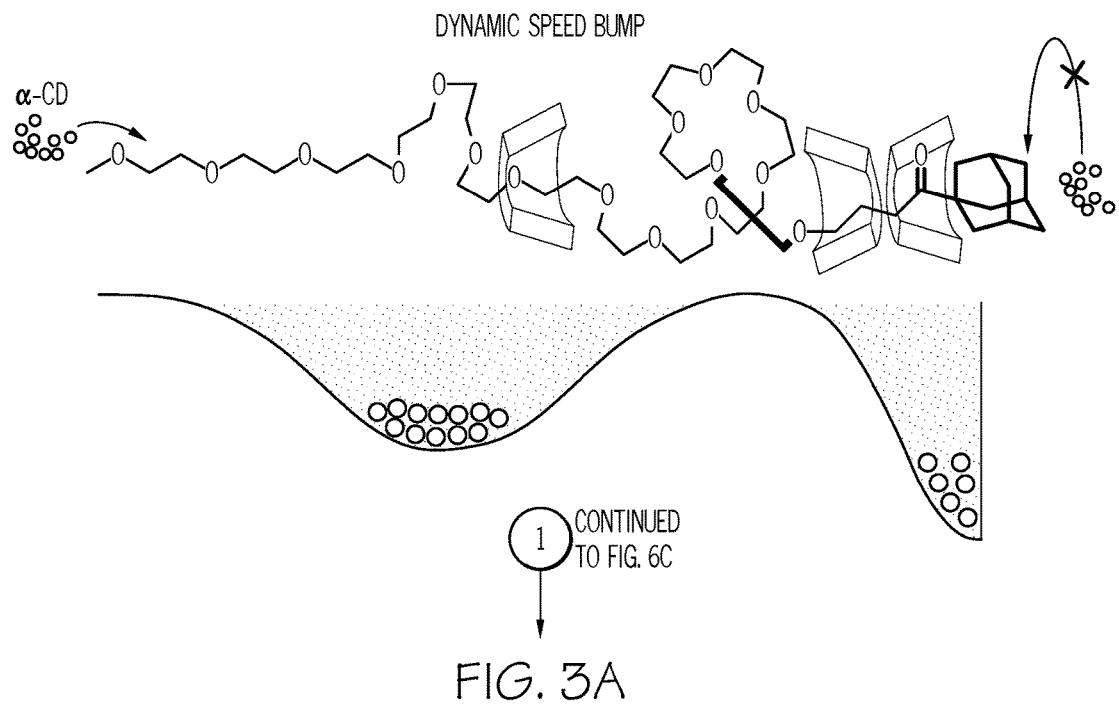
FIGS. 3A-3C show kinetic trapping of meta-stable polypseudorotaxane networks of different crosslinking densities. Adamantylester and norbonylester end group(s) were installed on PEG axles, creating kinetic barriers to diverge the threading and translocation of α-CDs, resolving a spectrum of polypseudorotaxanes in solution. These polypseudorotaxanes were trapped by kinetic micro-crystallization to afford physically crosslinked crystalline networks of various densities.
Figure 3B:
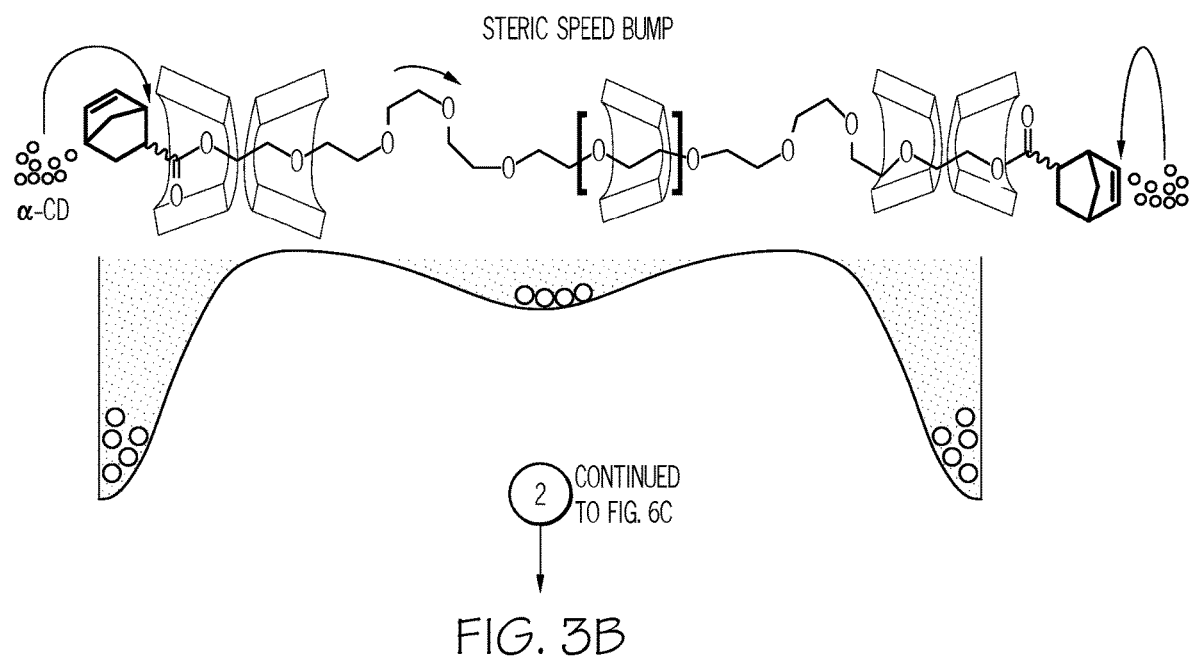
Figure 3C:
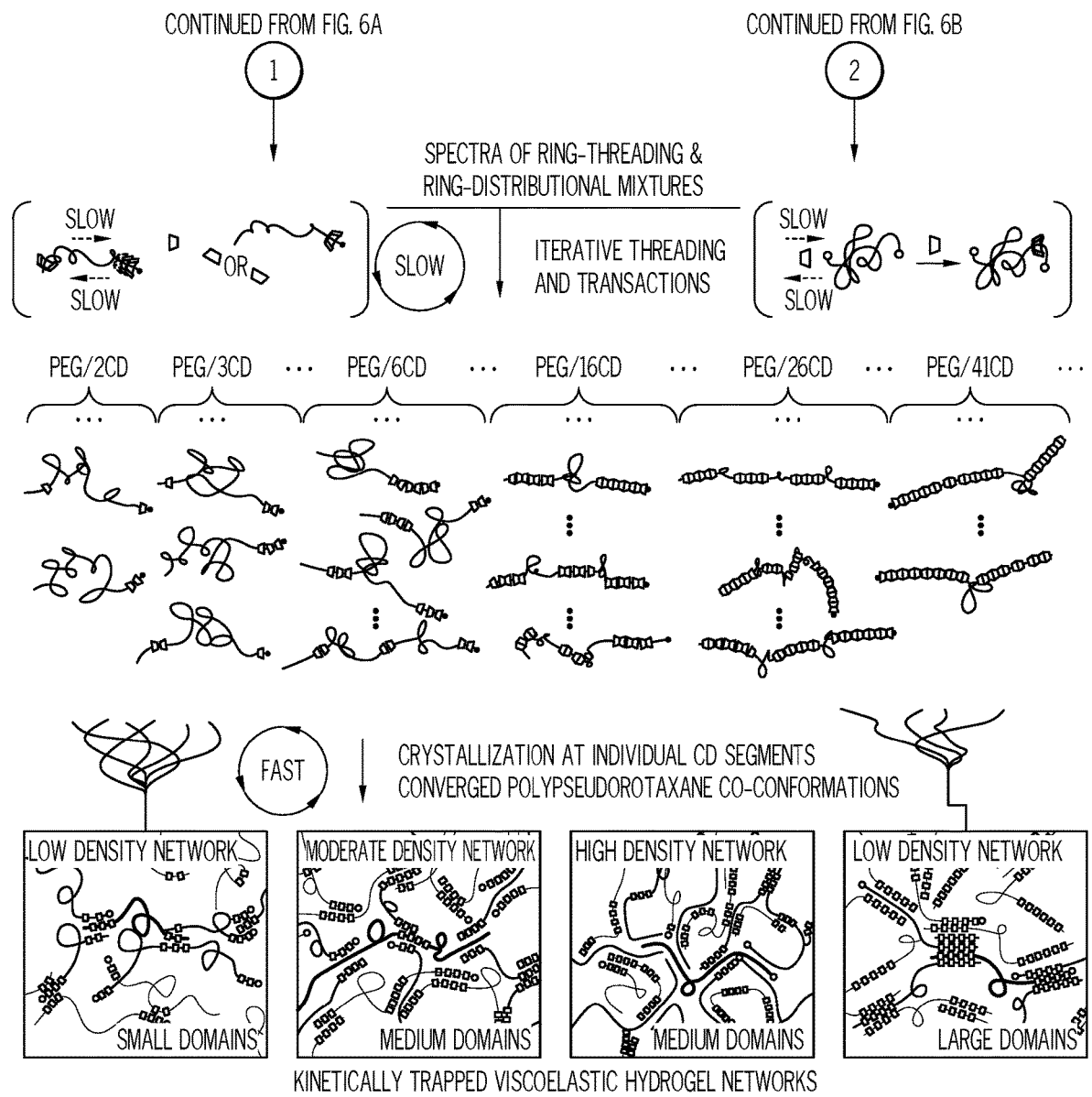

To access these kinetic variants chemically, the energy barrier for the formation of polypseudorotaxane in solution needs to be raised relative to the energy barrier of micro-crystallization (FIG. 2B). As illustrated in FIGS. 3A-3C, Applicant designed two types of energy barriers. By installing a stopper onto one end of the PEG, the translocation distances of $\alpha$-CDs are elongated compared to bare PEG. The coiled PEG axle acts as a dynamic energy barrier to slow down the translocation of $\alpha$-CDs. By attaching sterically demanding "speed bumps" onto both ends of the PEG, the threading of $\alpha$-CDs onto the PEG axle is decelerated.

Experimentally, Applicant chose adamantylester (-Ad) as the stopper and norbonylester (-Nor) as the speed bump (~4.7 Å) for $\alpha$-CDs, respectively. Smaller end groups, including hydroxyl (—OH), acetylester (-Ac), and benzoylester (-Bz), were also synthesized as $\alpha$-MeO-$\omega$-R-PEGs (FIGS. 2C-1, 2C-2, and 2C-3), which were employed as reference axles.

Figure 4A:
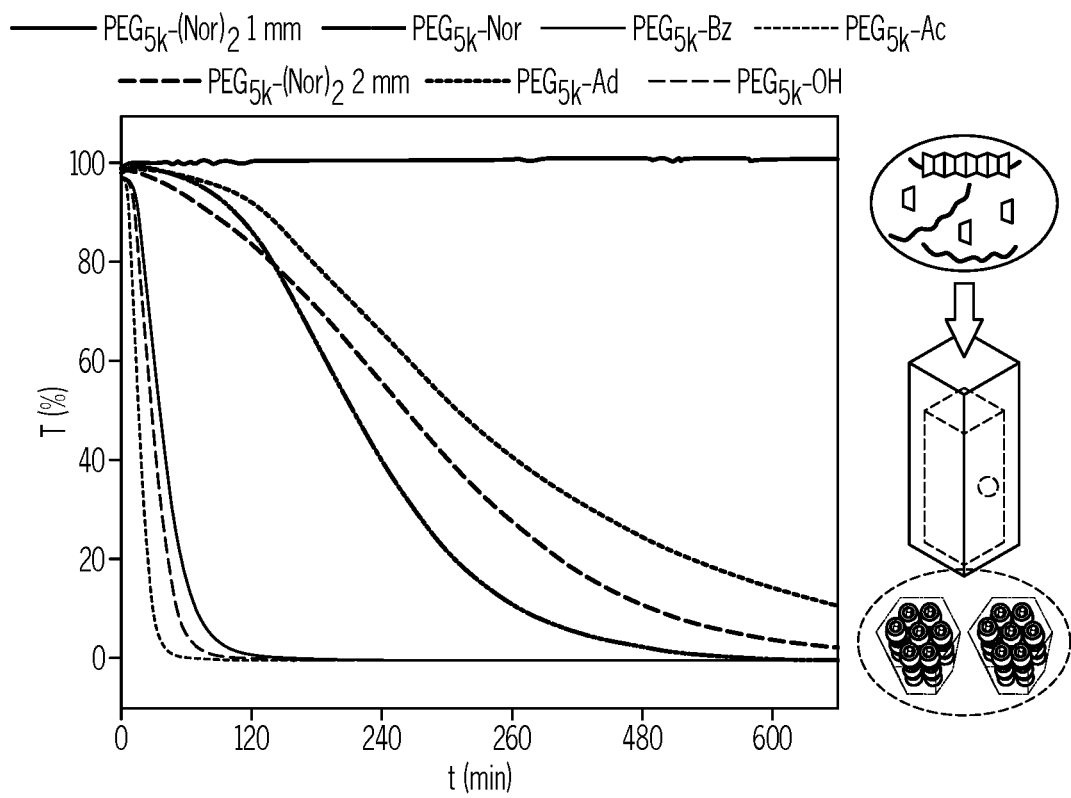
Figure 4B:
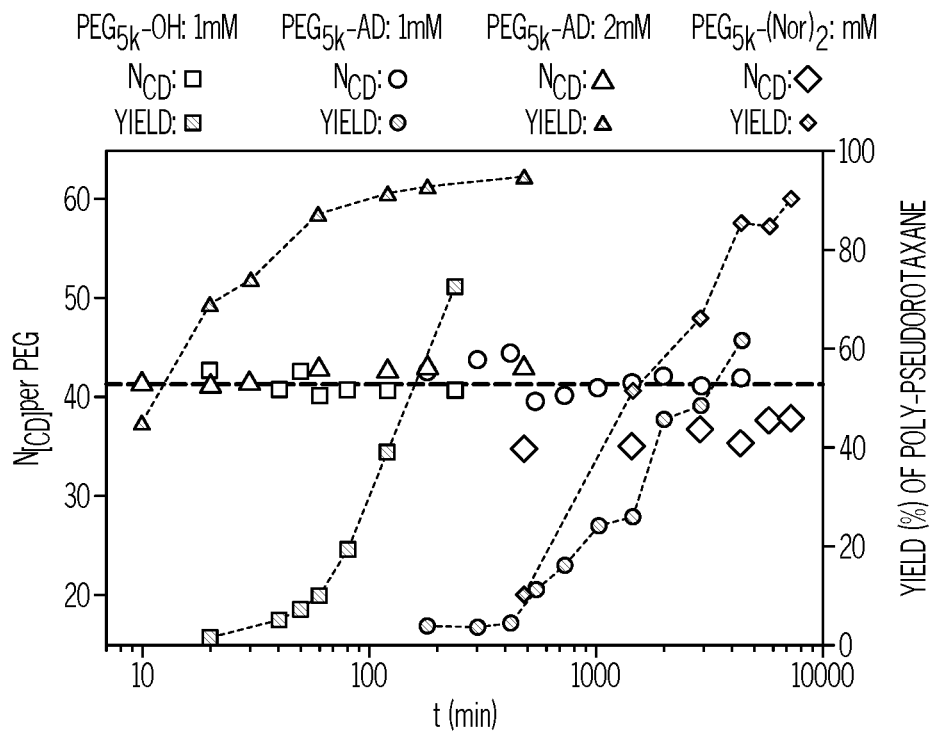

Example 1.2. Kinetic Investigations of Meta-Stable Polypseudorotaxane Networks Formation In a $PEG_{5k}$-OH (1 mM) and $\alpha$-CD (50 mM) mixture (20° C.), $\alpha$-CDs rapidly threaded onto $PEG_{5k}$-OH and crystallized as white suspensions. The transmittance of the reaction decreased rapidly over time (FIG. 4A) due to the increased light scattering (550 nm) of the fast-forming crystalline precipitates. Similarly, the transmittance of reactions of $PEG_{5k}$-Ac/$\alpha$-CD and $PEG_{5k}$-Bz/$\alpha$-CD also decreased quickly upon mixing. In parallel, crystalline $PEG_{5k}$-OH/$\alpha$-CD polypseudorotaxanes formed at different times were collected for $^1$H NMR analysis (FIG. 4B).

The number of $\alpha$-CDs threaded onto $PEG_{5k}$-OH was measured to be independent of the reaction time at a constant of 41±1 $\alpha$-CDs per PEG. These observations are consistent with previous reports, indicating the formation of these crystalline polypseudorotaxanes underwent the thermodynamic path.

Figure 4D:
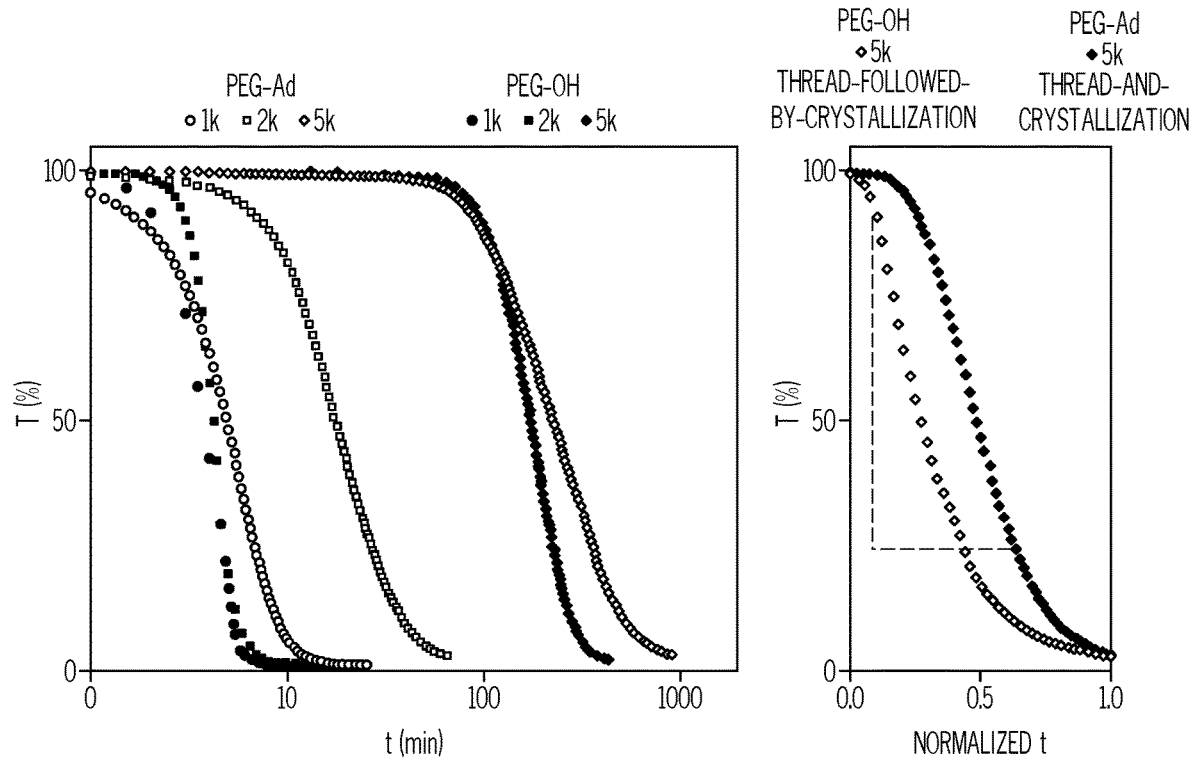
Figure 4D:
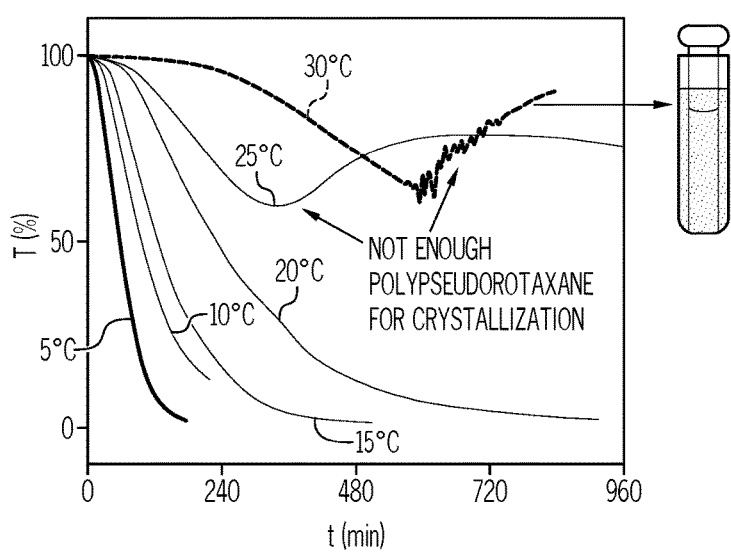

When $PEG_{5k}$-Ad (1 mM) was mixed with $\alpha$-CD (50 mM) at 20° C., the transmittance of the reaction did not change for a long period (— 100 min, FIGS. 4C-1 and 4C-2), suggesting that the rate of polypseudorotaxane formation is significantly reduced compared to $PEG_{5k}$-OH/$\alpha$-CD (~15 min) in solution. Time-dependent $^1$H NMR experiments revealed that the polypseudorotaxane consists of a constant 42±2 α-CDs per PEG$_{5k}$-Ad (FIG. 4B). In the temperature-dependent polypseudorotaxane formation experiments (FIG. 4D), the reaction of PEG$_{5k}$-Ad and α-CD showed 'V'-shaped transmittance changes at 25 and 30° C. This two-stage polypseudorotaxanes precipitation was also confirmed in the time-dependent $^1$H NMR experiment. These experiments suggested that, over a period of time, the accumulated PEG$_{5k}$-Ad/α-CD polypseudorotaxanes in solution were not sufficient to allow for continuous crystallization. The rate of the PEG$_{5k}$-Ad-based polypseudorotaxanes formation in solution and the rate of their crystallization became much more comparable.

The differences in crystallization kinetics between PEG$_{5k}$-OH/α-CD and PEG$_{5k}$-Ad/α-CD polypseudorotaxanes were investigated by temperature-dependent transmittance experiments (FIG. 4D) and their crystallizations energy barrier difference was calculated as $E'_{crys}-E_{crys}=-24$ kJ/mol (FIG. 2). The faster crystallization of PEG$_{5k}$-Ad/α-CD polypseudorotaxanes is evident in the early onset of transmittance decrease in the time-normalized transmittance spectra (FIGS. 4C-1 and 4C-2), where the crystallization of PEG-Ad polypseudorotaxanes took place concurrently with the formation of the polypseudorotaxanes in solution, compared to the formation-followed-by-crystallization process in the case of the PEG-OH polypseudorotaxanes. Therefore, the raised energy barrier of PEG$_{5k}$-Ad/α-CD polypseudorotaxanes formation in solution and decreased energy barrier of crystallization enabled a concerted threading-and-crystallization process, where the as-formed polypseudorotaxanes were rapidly trapped by crystallization.

PEG$_{5k}$-OH/α-CD and PEG$_{5k}$-Ad/α-CD polypseudorotaxanes have nearly identical numbers of threaded α-CDs. The large differences of their assembly kinetics in solution and crystallization implied that PEG-Ad/α-CD polypseudorotaxanes possess very different structures compared to the tubular PEG-OH/α-CD polypseudorotaxanes.

When the first few α-CDs threaded on to PEG$_{5k}$-Ad, the α-CD/Ad side-on complexation drove these α-CDs to translocate throughout the entire PEG axle to reach the -Ad end. This side-on complexation formation was confirmed as the binding affinity between an oligo-glycol adamantylester 2EG-Ad and α-CD was measured as $K_a=105$ M$^{-1}$ at 25° C., being larger than the affinity of $K_a=5$ M$^{-1}$ for 2EG and α-CD.

Increasing the (EG)$_2$ moieties to 4EG-Ad and 6EG-Ad, the binding affinities between α-CD and every extended (EG)$_2$ moiety decreased gradually. When the PEG$_{5k}$-Ad axle reached 5 k Da, the later threaded α-CDs could be segregated kinetically between coiled PEG segments at different locations (FIGS. 3A-3C), in which the coiled PEG axle acted as a dynamic translocation energy barrier. To confirm this possibility, shorter PEG-OH and PEG-Ad axles (1 k and 2 k Da) were employed for the time-dependent polypseudorotaxanes formation experiments (FIGS. 4C-1 and 4C-2). Reducing the axle length from 5 k to 2 k and 1 kDa, the formation and crystallization between PEG-Ad and PEG-OH polypseudorotaxanes became increasingly comparable, since less segmented α-CD blocks could be kinetically trapped on shorter PEG-Ad axles.

When these polypseudorotaxanes with segmented α-CD blocks crystallized before they reached the thermodynamically preferred tubular co-conformations in solution, these kinetically resolved polypseudorotaxanes were trapped as micro-crystallized meta-stable aggregates. This early crystallization could be attributed to faster diffusion and conformational relaxation of the segmented α-CD blocks.

Figure 4F:
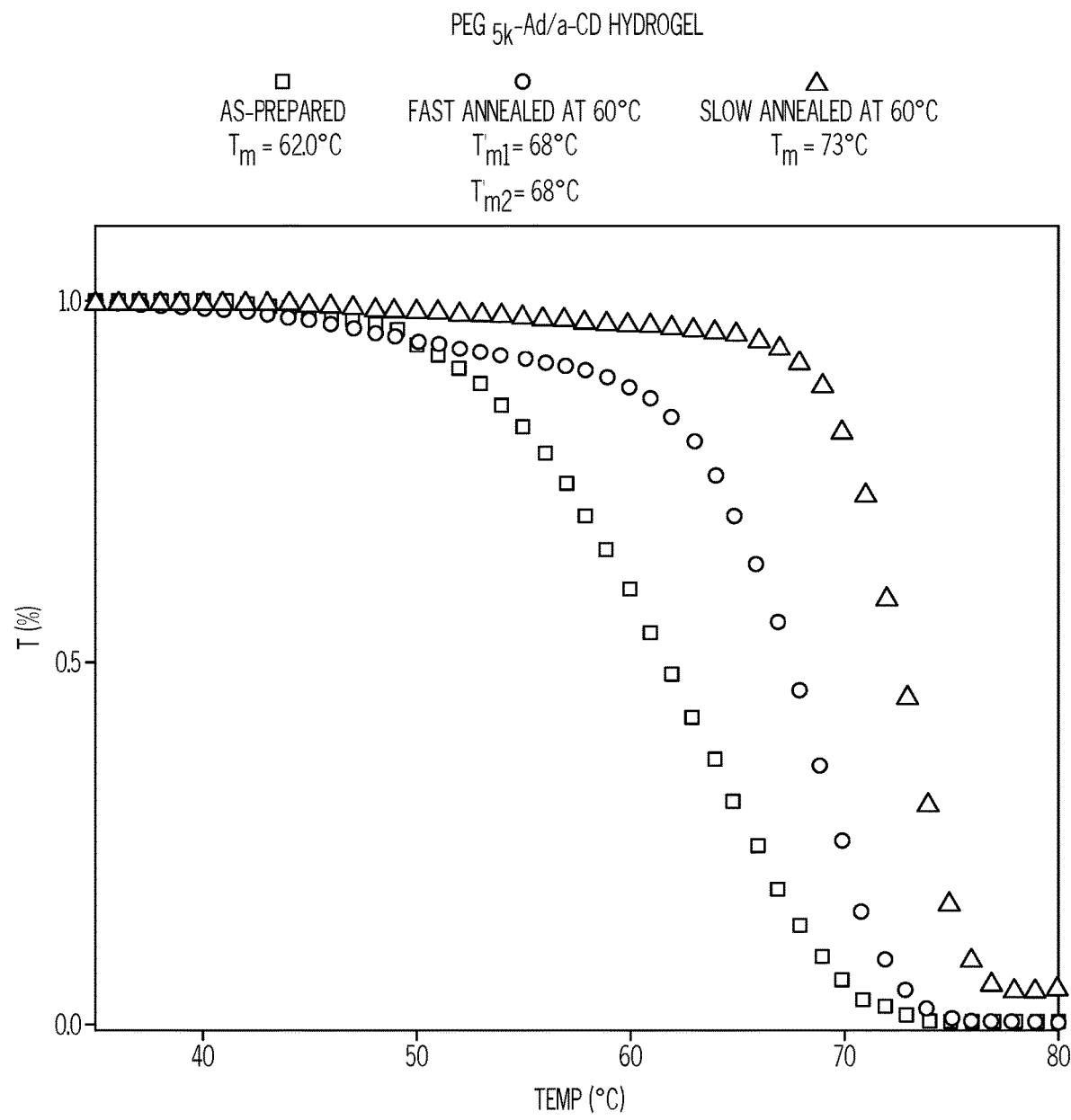

To assess the energy differences between the crystallized PEG$_{5k}$-OH/α-CD and PEG$_{5k}$-Ad/α-CD polypseudorotaxanes, melting curve analyses were carried out (FIGS. 4E-F). The melting points ($T_m$) were measured to reflect the energy required to extensively break the multivalent hydrogen bonding interactions of the crystalline domain. Compared to a $T_m=69°$ C. and a narrow melting profile of PEG$_{5k}$-OH/α-CD, the lower $T_m=64°$ C. and broader melting curve of PEG$_{5k}$-Ad/α-CD (FIGS. 4E-1, 4E-2 and 4E-3) suggest that less extensive hydrogen-bonding networks were formed in its crystalline domains. Annealing the PEG$_{5k}$-Ad/α-CD polypseudorotaxanes resulted in narrower melting profiles and higher $T_m$ in PEG$_{5k}$-Ad/α-CD (FIG. 4F).

These experiments suggested that the formed PEG$_{5k}$-Ad/α-CD polypseudorotaxanes are kinetic products with higher energies compared to their stable states. The broad melting profile of the as-prepared PEG$_{5k}$-Ad/α-CD sample suggested that the PEG$_{5k}$-Ad/α-CD polypseudorotaxanes were constituted by a dispersed mixture of PEG$_{5k}$-Ad/α-CD co-conformers, which were converged to the stable conformer during the annealing process. Furthermore, the melting temperature differences between the PEG-Ad/α-CD and PEG-OH/α-CD polypseudorotaxanes at shorter PEG axles were smaller (FIGS. 4E-1, 4E-2 and 4E-3) since the translocation energy barriers for α-CDs are decreased at short PEG axles.

When PEG-(Nor)$_2$ of different molecular weights were employed as axles, the bulky -Nor end groups reduce the rate of α-CD (de)threading, resulting in fewer threaded α-CDs per PEG$_{5k}$-(Nor)$_2$ (a constant of 36±1 α-CDs, FIG. 4B). Since the -Nor moieties also formed side-on complexes with α-CDs, less dispersed co-conformers of polypseudorotaxanes were trapped kinetically, featuring α-CD blocks at each chain end and the middle of the PEG (FIGS. 3A-3C). This is evident in the narrower melting profiles of PEG$_{1-5k}$-(Nor)$_2$/α-CD polypseudorotaxanes (FIGS. 4E-1, 4E-2 and 4E-3).

Figure 5A:
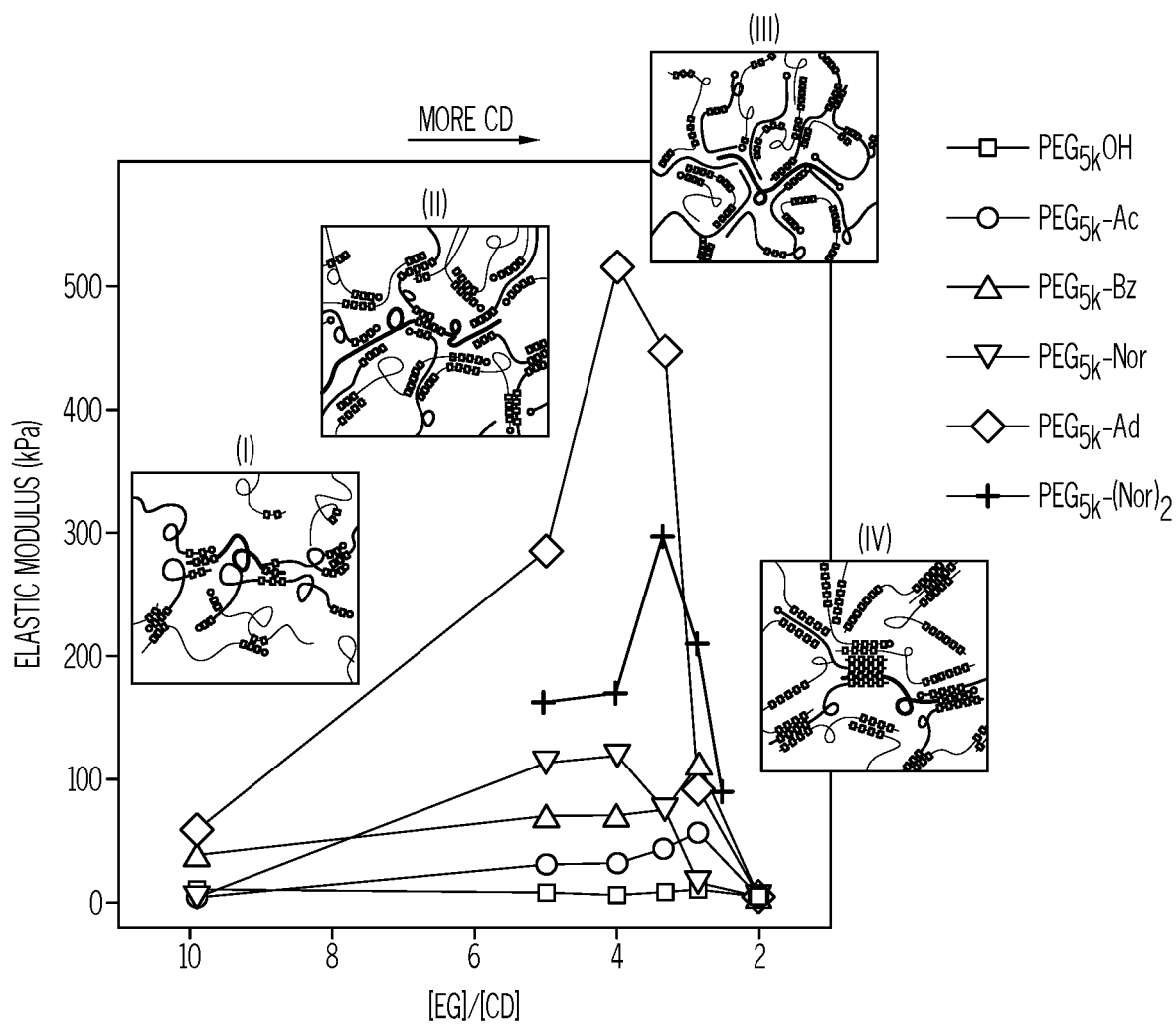
FIGS. 5A and 5B show rheological investigations of kinetically trapped polypseudorotaxane networks.

Note that higher reactant concentrations are required to form crystalline polypseudorotaxane aggregates, which indicates that the crystallization threshold could be adjusted (i.e. reaction concentrations) to selectively trap polypseudorotaxanes in different kinetic states. At higher concentrations, PEG$_{5k}$-Ad/α-CD polypseudorotaxane ([PEG$_{5k}$-Ad]=6 mM) formed much stronger hydrogels compared to PEG$_{5k}$-OH/α-CD hydrogels at various EG/α-CD ratios (FIG. 5A). When decreasing the EG/α-CD ratio from 10:1 to 2:1 (more fed α-CD, I to IV, FIG. 5A), the elastic moduli of the hydrogels composed of PEG$_{5k}$-Ad/α-CD increased firstly to a maximum G'=0.52 MPa at EG/α-CD=4:1 and then decreased. Changing the fed EG/α-CD ratio from 10:1 to 4:1, the number of threaded α-CDs increased from 15 to 28 α-CDs per PEG.

More segmented α-CD blocks were kinetically trapped and crystallized, which increased the crosslinking density of the hydrogel networks to an optimized network density and crystalline domain size (III, FIG. 5A). Further changing the EG/α-CD ratio to 2:1, the number of threaded α-CDs increased to 44 α-CDs per PEG, which significantly lowered the number of α-CD blocks formed on the PEG axle and reduced the network crosslinking density (IV, FIG. 5A). Similarly, a 'Λ'-shaped elastic moduli variation of hydrogels formed by PEG$_{5k}$-(Nor)$_2$/α-CD were also measured at different EG/α-CD ratios (FIG. 5A).

Figure 5B:
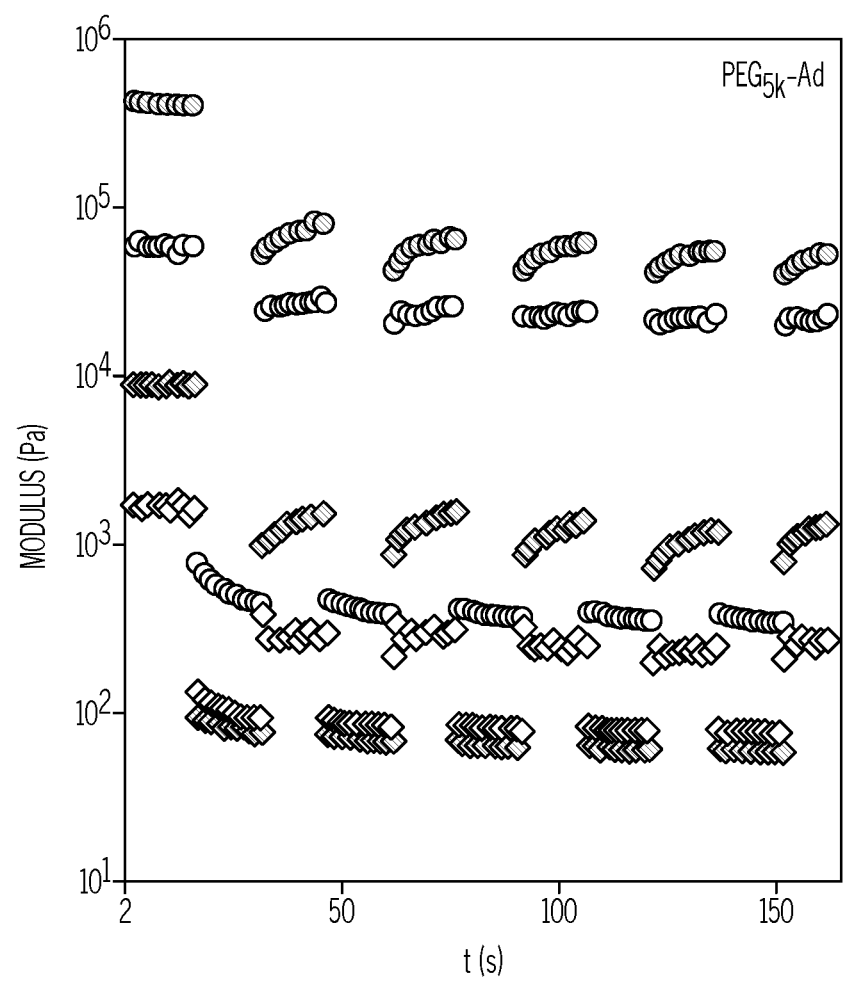

The maximum G'=0.30 MPa of PEG$_{5k}$-(Nor)$_2$/α-CD hydrogel was recorded in EG/α-CD=3.3:1, in which an averaged 26 α-CDs were threaded on the axle. In great contrast, the elastic moduli of PEG$_{5k}$-OH/α-CD polypseudorotaxane hydrogels demonstrated little change at various EG/α-CD ratios, highlighting the differences of the polypseudorotaxane networks formed under kinetic (PEG$_{5k}$-Ad/α-CD and PEG$_{5k}$-(Nor)$_2$/α-CD) and thermodynamic (PEG$_{5k}$-OH/α-CD) paths. Step-strain rheological experiments (FIG. 5B) showed that both PEG$_{5k}$-Ad/α-CD and PEG$_{4-5k}$-Nor/α-CD hydrogels exhibited rapid self-healing properties for 3D-printing, but PEG$_{5k}$-OH/α-CD hydrogels were not 3D-printable.

Example 1.3. Structural Analyses of α-CD/PEG Polypseudorotaxanes

To structurally verify the segmented α-CD blocks in the kinetically trapped polypseudorotaxanes hydrogels, small-, wide-angle X-ray diffractions (S/WAXS), and scanning electron microscopy (SEM) analyses were carried out. However, the widely adopted parallelly packed PEG/α-CD polypseudorotaxanes model disfavors the crystallization of α-CD blocks of different sizes.

Figure 6A:
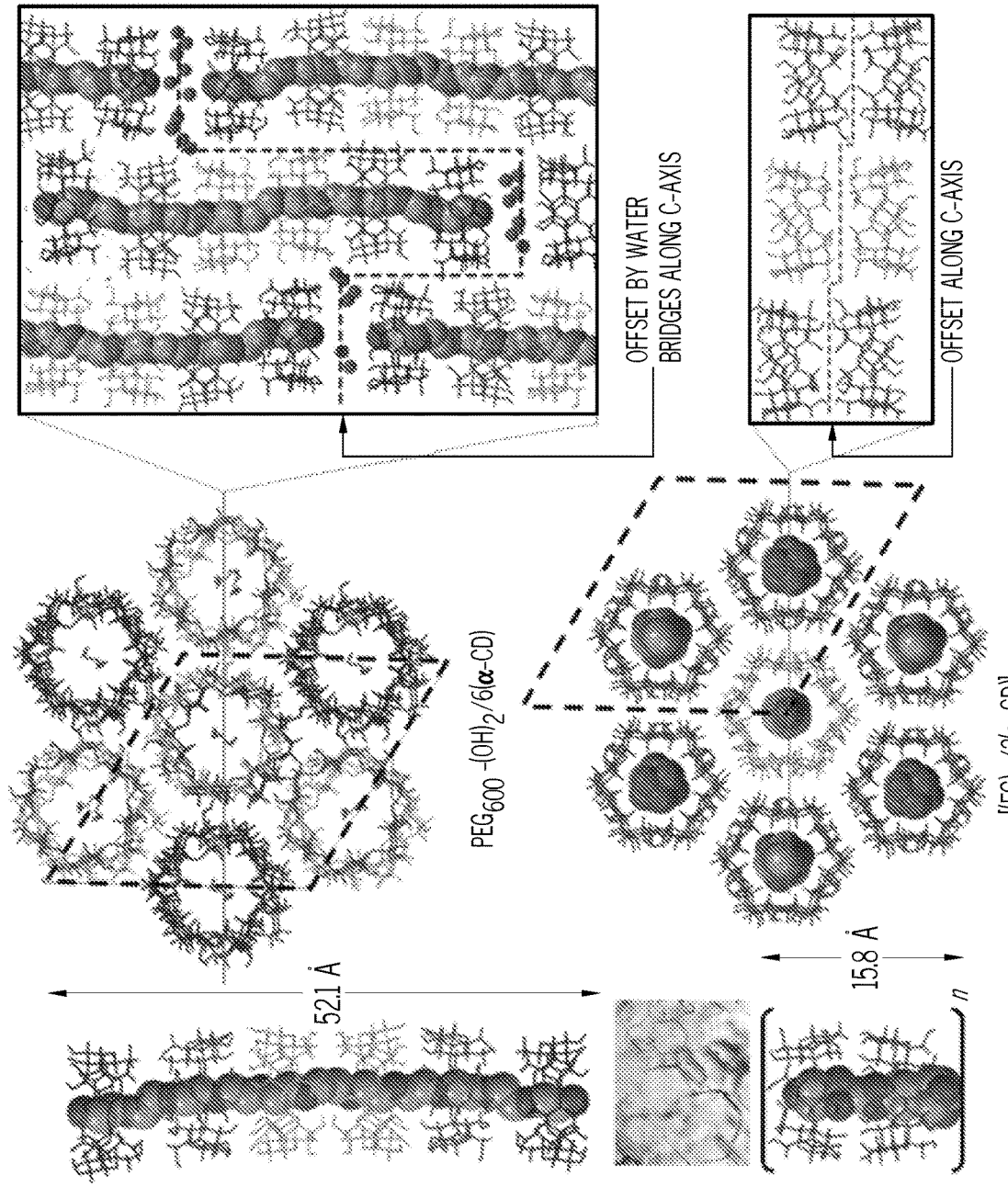

Applicant obtained high-quality hexagonal single-crystals of PEG$_{600}$-(OH)$_2$/α-CD polypseudorotaxanes (FIG. 6A). For the first time, Applicant revealed the molecular details of the crystalline domains. Two co-existing polymorphs of PEG$_{600}$/α-CD polypseudorotaxanes were consistently discovered as PEG$_{600}$-(OH)$_2$/6 (α-CD) and [(EG)$_4$/2(α-CD)]$_n$ complexes through a solvent evaporation method. The major polymorph PEG$_{600}$-(OH)$_2$/6 (α-CD) complex (FIG. 6A) crystallized into trigonal P3$_2$21 space group with a=b=23.7877 Å, c=52.0858 Å. The minor polymorph [(EG)$_4$/2(α-CD)]$_n$ complex (FIG. 6A) crystallized into P321 space group with a=b=23.5446(15) Å, c=15.7523 Å. In the PEG$_{600}$-(OH)$_2$/6 (α-CD) complex, there are six α-CDs hydrogen-bonded in a head-to-head and tail-to-tail manner on the PEG axle. The secondary faces of the two α-CDs located at the PEG chain end (blue colored, O•••O=6.45 and 6.71 Å, FIG. 6A) are hydrogen-bonded via water molecules along the c-axis. In [(EG)$_4$/2(α-CD)]$_n$, threaded α-CDs on the PEG are tightly packed continuously between two adjacent rings, and the PEG$_{600}$ axles are crystallographically disordered along the c-axis. It is worth noting that, the polypseudorotaxanes in both polymorphs were packed unparallel and offset along the c-axis (FIG. 6A), which corrected the previously suggested parallel packing models without offsetting.

Figure 6B:
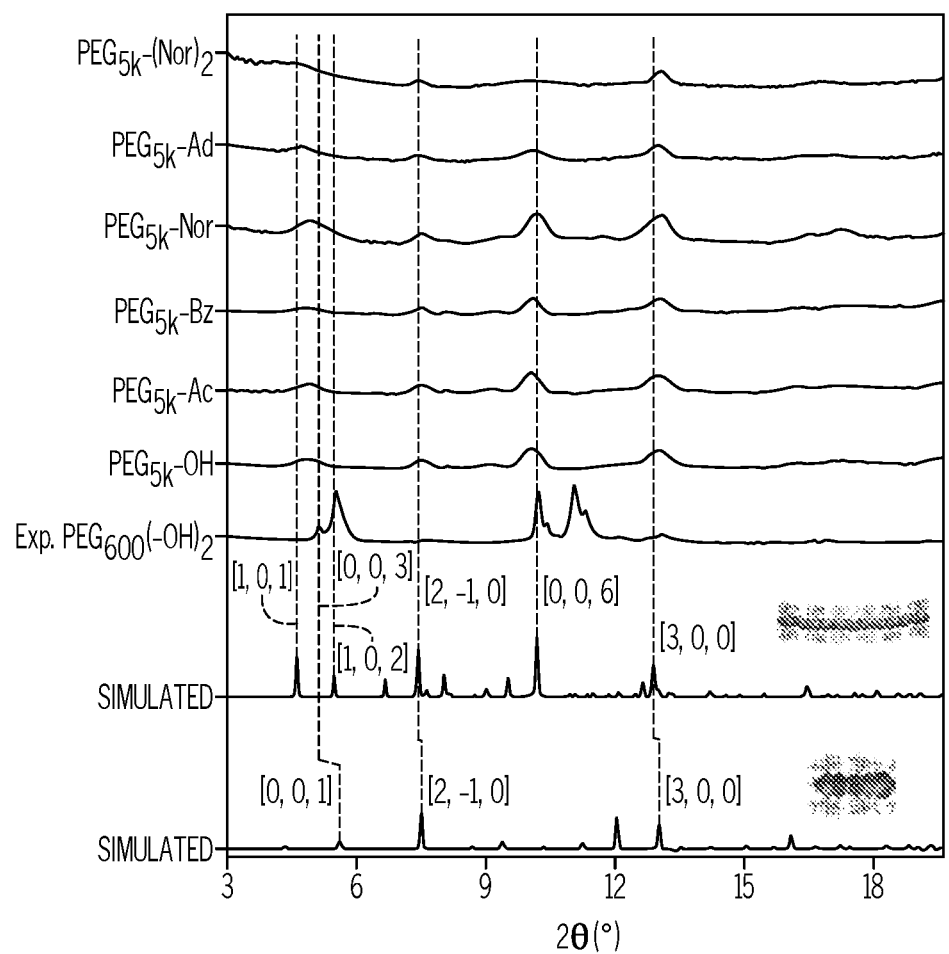

The offset packing of polypseudorotaxanes could allow the co-crystallization of size ill-matched α-CD blocks from different polypseudorotaxanes along the c-axis, similar to those double helices formed by ill-matched DNA base pairs. Applicant used experimental and simulated WAXS profiles of PEG$_{600}$-(OH)$_2$/α-CD polypseudorotaxanes to index the diffraction profiles of the polypseudorotaxane hydrogels. In PEG$_{5k}$-OH/α-CD, PEG$_{5k}$-Ac/α-CD, and PEG$_{5k}$-Bz/α-CD hydrogels (FIG. 6B), similar diffraction peaks with their Miller indices were assigned as 2θ=5.0° [0, 0, 3l], 7.5° [2, −1, 0], 10.1° [0, 0, 6l], 13.0° [3, 0, 0], in which l is an integral number reflecting different c-axis lengths. In PEG$_{5k}$-Ad/α-CD hydrogel, the diffraction peaks at 2θ=5° and 10.1° were broadened, indicating that the c-axis of each crystalline domains in these hydrogels were dispersed. The structural differences of the crystalline domains formed in PEG$_{5k}$-R/α-CD with different end groups were more pronounced in SAXS and SEM analyses (FIGS. 6C-6D).

Clear fringes fitted to the sheet-like form factor of 36.0, 37.5, and 38.0 nm were recorded in PEG$_{5k}$-OH/α-CD, PEG$_{5k}$-Ac/α-CD, and PEG$_{5k}$-Bz/α-CD hydrogels, respectively, with sub-micron sized hexagonal sheet-like observed in SEM (FIGS. 6D-1, 6D-2, 6D-3, 6D-4, 6D-5, and 6D-6). In contrast, fringes of kinetically trapped PEG$_{5k}$-Ad/α-CD hydrogel were fitted to a sheet-like thickness of 9.1 nm with much fewer structural features, indicating that the segmented α-CD blocks comprised about 10 α-CDs on average. In PEG$_{2k}$-Ad/α-CD hydrogel, diffraction fringes with better structural features were fitted a sheet-like of 15.8 nm, indicating that the crystalline domains formed using shorter PEG$_{2k}$-Ad axle are larger and less disordered. Similarly, the S/WAXS profiles of the PEG$_{4/5k}$-(Nor)$_2$/α-CD hydrogels contained fewer structural details. Their structures were suggested as disordered lamellar assemblies by comparing to the clear fringes in shorter chain PEG$_{1-2k}$-(Nor)$_2$/α-CD hydrogels (FIGS. 6C-1, 6C-2, 6C-3, 6C-4, 6C-5, and 6C-6). When α-CDs surmounted the -Nor speed bumps of shorter PEG$_{1/2k}$-(Nor)$_2$, they were concentrated locally at each chain ends. When the PEG chain lengths were extended to PEG$_{4/5k}$-(Nor)$_2$, segmented α-CD blocks at the chain ends and random sites of the chain emerged, which nucleated individually to form branched meta-stable crystalline networks (FIGS. 3A-3C).

Example 1.4. 3D-Printing of Polyrotaxane Network Hydrogels

Figure 7A:
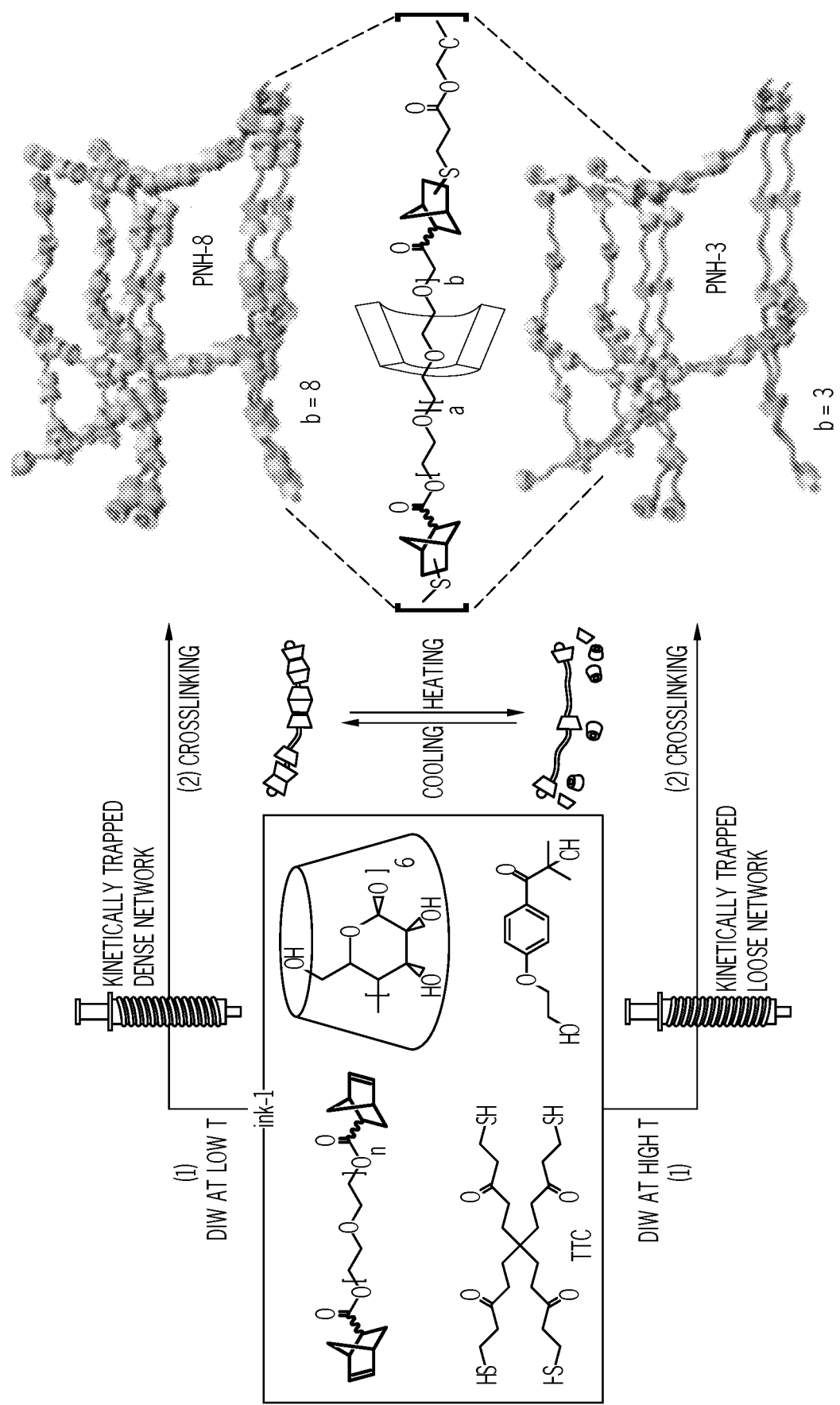
FIGS. 7A-E show two three-dimensional (3D)—printed polyrotaxane networks obtained from the same polypseudorotaxane hydrogel.
Figure 7B:
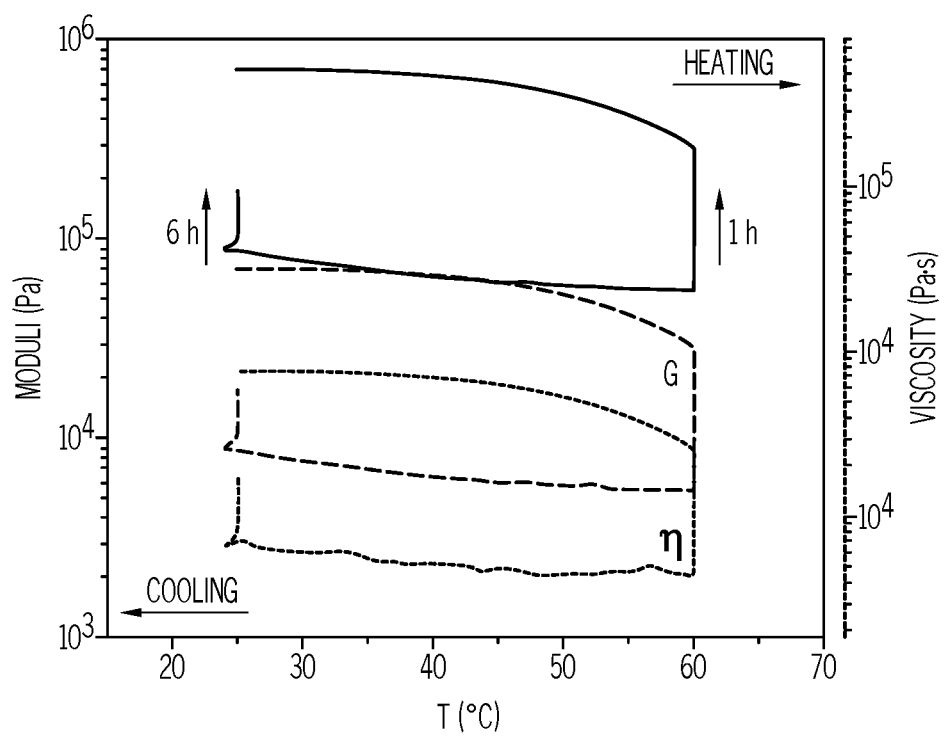

The concerted kinetic trapping of polypseudorotaxane networks enabled the possibility to trap different network architectures from the same reactive ensemble. We chose to trigger an initial temperature difference to the PEG$_{4k}$-(Nor)$_2$ and α-CD mixture at high concentrations to kinetically trap two meta-stable polypseudorotaxanes networks of different densities. They were subsequently covalently crosslinked as polyrotaxane networks. Experimentally, a hydrogel ink-1 (FIG. 7A) composed of PEG$_{4k}$-(Nor)$_2$ (22.5 mM), α-CD (308 mM), tetrathiol crosslinker TTC (11.3 mM), and a photo-initiator was optimized with suitable viscoelasticity for 3D-printing. Ink-1 possesses a high elastic modulus of G'=0.70 MPa at 25° C. (FIG. 7B). Increasing the reaction temperature, the overall binding affinity between α-CDs and PEG-(Nor)$_2$ decreased, which dismantled the original crystalline network, dethreaded some α-CDs, and formed a new crystalline network. At 60° C. for 1 h, the elastic modulus of ink-1 was reduced to 56 kPa but remained viscoelastic for 3D-printing. After rapid cooling to 25° C., the elastic modulus of ink-1 increased very slowly at ambient conditions (FIG. 7B), suggesting that the meta-stable crystalline network formed at 60° C. prevented rapid α-CD rethreading at room temperature.

Figure 7C:
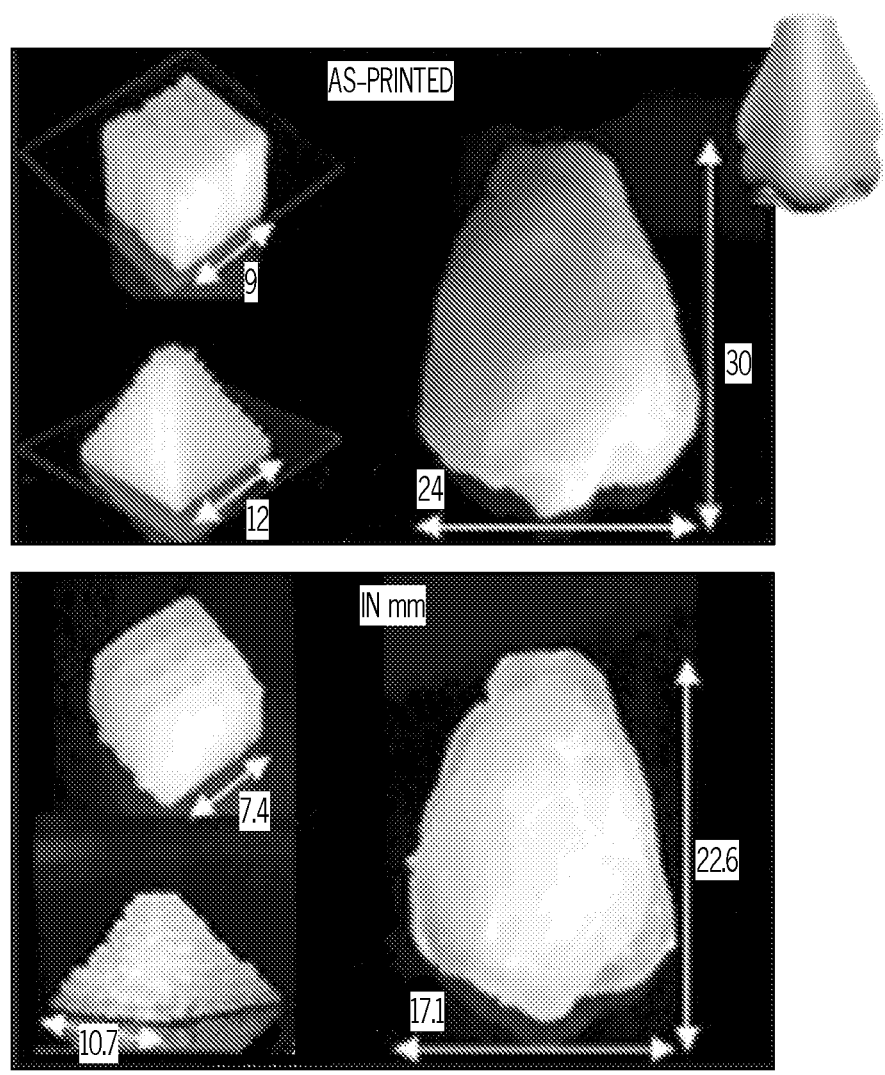
Figure 7D:
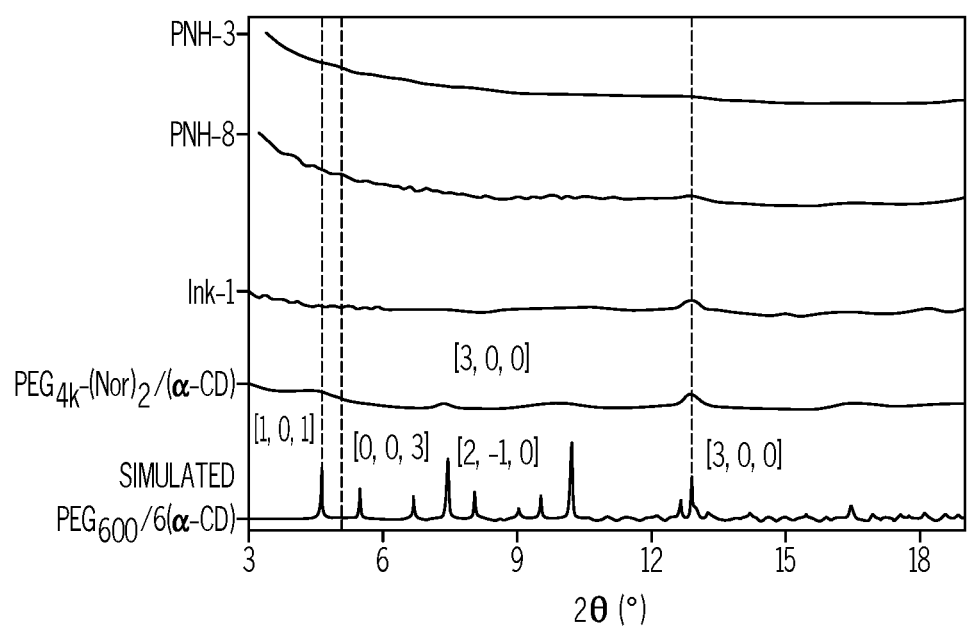

After thiol-ene crosslinking, the polypseudorotaxanes 3D-printed at 20 and 60° C. were converted to polyrotaxane network hydrogels (PNHs) as PNH-8 and PNH-3 (FIG. 7C), respectively. An α-CD-free hydrogel PNH-0 was also synthesized in DMF for reference. The averaged molar ratios of PEG$_{4k}$-(Nor)$_2$/α-CD/TTC components in PNH-8 and PNH-3 were revealed by $^1$H NMR hydrolysis as 1:8.0±0.7: 0.62±0.02 and 1: 2.9±0.4:0.67±0.05, respectively. The covalent network densities in these PNHs were similar, as suggested by the ratios of PEG$_{4k}$-(Nor)$_2$/TTC. There are eight α-CDs per PEG in PNH-8, compared to only three α-CDs per PEG in PNH-3. The WAXS profiles of PNHs were broad (FIG. 7D), because fewer interlocked α-CDs and the limited PEG chain diffusion in PNHs reduced their crystalline domain sizes proportionally, compared to the parent ink-1.

Figure 7E:
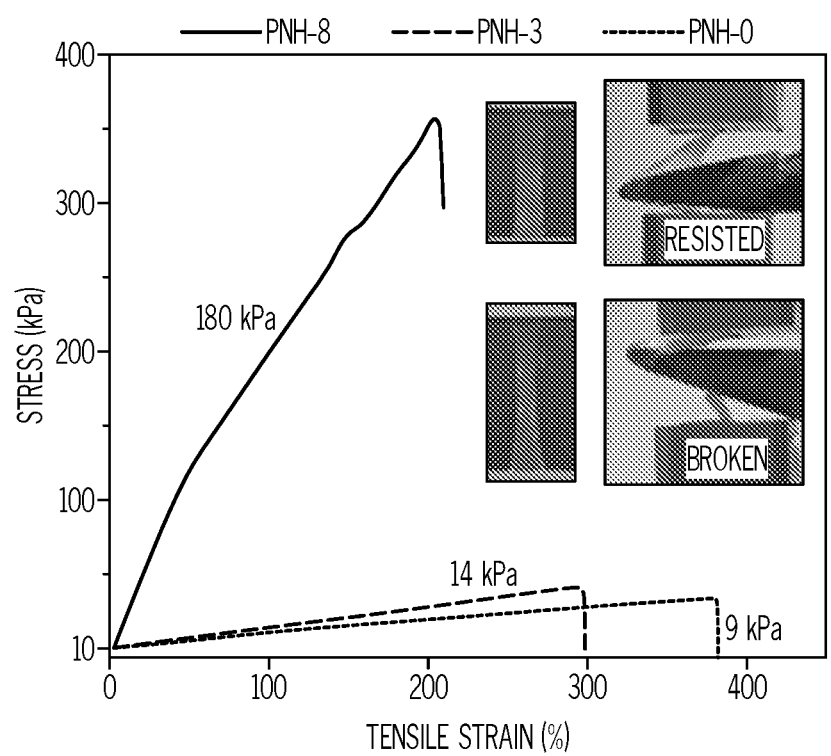

At the macroscale, Young's moduli of PNH-0, PNH-3, and PNH-8 were measured as 9, 14, and 180 kPa, respectively (FIG. 7E). PNH-3 showed slightly enhanced Young's moduli over PNH-0 due to its sparsely distributed hydrogen-bonded crystalline network. PNH-8 was significantly tougher than PNH-3 in the pencil penetration test (FIG. 7E) benefiting from its denser crystalline network formed by more interlocked α-CDs.

The different numbers of interlocked α-CDs in PNH hydrogels gave them different moisture-responsiveness at varied relative humidities (RH). When PNH-3 and PNH-8 were placed in sealed chambers of different RH, PNH-3 swelled to 270% at RH=58% with significantly reduced Young's moduli (FIGS. 8A-1, 8A-2, and 8A-3). In comparison, PNH-8 showed better resistance to humidity change, since its denser crystalline network formed by segmented α-CD blocks competed against the osmatic pressure variation upon moisturizing.

Figure 8B:
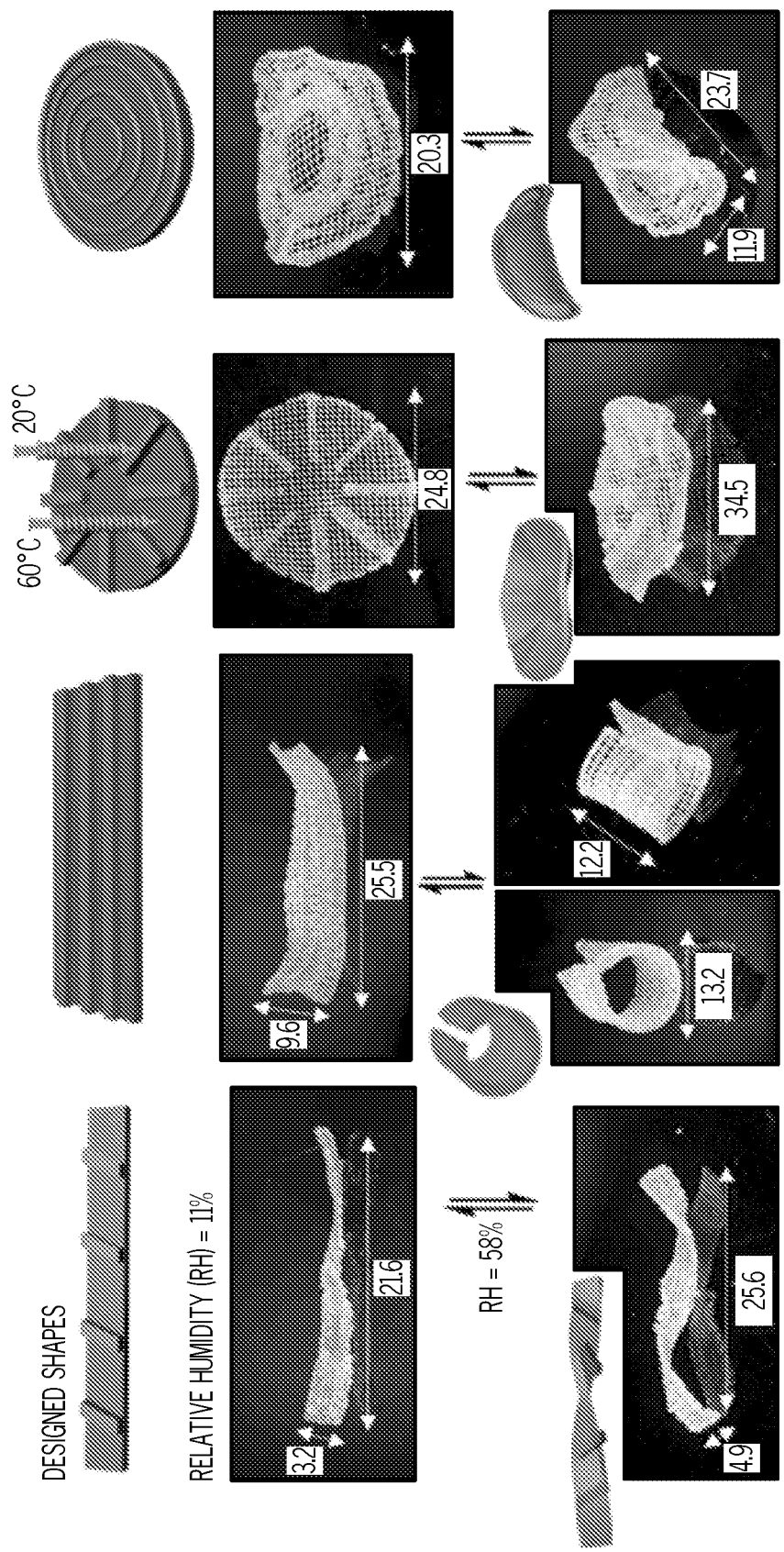

By designing the 3D-printing script, a series of heterogeneous lattices (FIG. 8B) were 3D printed, using the 60° C. ink-1 (green) and the 20° C. ink-1 (red), followed by photo-crosslinking. At a low RH of 11%, the lattices resemble their as-printed shapes (FIG. 8B). After being placed in a closed chamber at RH=58%, they morphed into different shapes as designed (FIG. 8B).

When ink-1 was 3D-printed into a flower model (FIGS. 8C-1 and 8C-2), its lower section and the core were printed using the 60° C. ink-1 and the top section was printed using the 20° C. ink-1. After photo-crosslinking, the compositions of the heterogeneous polyrotaxane flower was revealed as $PEG_{4k}$-$(Nor)_2$:α-CD ratios of 1: 7.6±0.5 and 1: 3.5±0.2 for the top and bottom sections, respectively. The dried flower (FIGS. 8C-1 and 8C-2) bent slightly inwards due to the higher density of the α-CD crystalline domains in the top section. When this monolith was exposed to moisture, it folded inwards in 6 mins (FIGS. 8C-1 and 8C-2). During this process, the top layer possessing a denser α-CD crystalline network persisted against osmatic pressure variation, but the bottom layer swelled quickly due to the solvation of its mostly unthreaded PEG and sparse crystalline network. These shape-morphing in response to the relative humidity change enabled the fabrication of environmentally controlled actuators with low energy consumption, providing a sustainable solution for the development of smart devices.

Example 1.5. Discussion

In summary, Applicant's discovery demonstrated a chemical approach to synthesize 3D-printable poly(pseudo)rotaxane materials through a concerted kinetic coupling of polypseudorotaxane formation in the solution phase with their micro-crystallization in the gel phase. Through the installation of sterically demanding end groups on PEG, Applicant created kinetic barriers for α-CDs threading and translocation, and resolved a spectrum of previously transient states in the solution phase. These polypseudorotaxanes with segmented α-CD blocks possess a lower kinetic barrier for micro-crystallization, forming polypseudorotaxane hydrogels with different network architectures.

Applicant demonstrated that the kinetically trapped PEG-Ad/α-CD and PEG-$Nor_2$/α-CD polypseudorotaxanes form less-ordered α-CD blocks on the PEG axles. Applicant's single-crystal X-ray analysis of PEG-$OH_2$/α-CD polypseudorotaxanes corrected the long-standing misunderstanding of the packing models of polypseudorotaxanes. The revealed unparallel packing of polypseudorotaxanes indicated the possibility of forming crystalline domains using length varied α-CD blocks in our kinetic synthesis. Furthermore, Applicant demonstrated a simultaneous variation of polypseudorotaxane network architecture using the same reactive ensemble at different temperatures.

After dual-material 3D printing followed by chemical crosslinking, 3D printed heterogeneous lattices demonstrated moisture responsive actuations, which is enabled by the two polyrotaxane materials possessing different numbers of α-CDs at the nanoscale, different crystalline domains at the mesoscale, and different mechanical properties at the macroscale. Applicant's work not only showcased a concerted kinetic trapping approach capable of synthesizing materials in their higher energy states but also demonstrated a path to use less-ordered molecular assemblies that were previously considered disadvantageous to construct supramolecular polymer materials with superior properties. In addition, Applicant successfully synthesized kinetically stable hydrogels using medium to low molecular weight PEG derivatives (≤5 kDa), which overcame a long-standing obstacle in biomedical applications because current stable hydrogels formed by large molecular weight PEG presented problems to be filtered out by human kidneys.

Example 1.6. Time-Dependent $^1$H Nuclear Magnetic Resonance Experiments

To understand the crystallization process and examine the components remaining in the solution phase, time-dependent $^1$H NMR experiments were performed on reactions of polypseudorotaxane formed by α-CD (50 mM)/$PEG_{5k}$-OH (1 mM) or α-CD (50 mM)/$PEG_{5k}$-Ad (1 mM) in $D_2O$. $D_2O$ solutions of $PEG_{5k}$-OH (2 mM) or $PEG_{5k}$-Ad (2 mM) were added to NMR tubes to acquire their proton resonances. Upon the addition of α-CD (50 mM), periodic acquisitions (every 10 min for $PEG_{5k}$-OH and 30 min for $PEG_{5k}$-Ad) were performed until correspondent polypseudorotaxane formed a hydrogel-like aggregate and broadened the $^1$H NMR signal (160 min for $PEG_{5k}$-OH and 15 h for $PEG_{5k}$-Ad).

Example 1.7. Binding Affinities and Stoichiometries Measurements

The binding affinities and stoichiometries of the complexes formed between Nor-$CO_2Na$, 2EG-Ad, 4EG-Ad, 6EG-Ad, and α-CD were measured by $^1$H NMR titration. $D_2O$ solutions of Nor-$CO_2Na$ or nEG-Ad (n=2, 4, 6, 2.0 mM) were titrated with α-CD solutions. The α-CD solutions (20, 40 and 60 mM respectively for n=2, 4, 6) were prepared by dissolving α-CD in a Nor-$CO_2Na$ or nEG-Ad (2.0 mM) $D_2O$ solution. The binding constant between Nor-$CO_2Na$ was fitted using the algorithms provided by Supramolecular.org using a 1:1 binding model. Binding constants between 2/4EG-Ad were fitted using the algorithms in a 1:1 binding model and 1:2 binding model (full and additive). The 1:3 binding model for 6EG-Ad with α-CD was accessed using MATLAB provided by literature with a minor adaptation to NMR systems. Job's plot was performed on the complexes formed between 4EG-Ad, 6EG-Ad and α-CD, revealing the formation of 1:2 and 1:3 complexes, respectively. To elucidate the binding affinities between nEG-Ad (n=2, 4, 6) and α-CD, and to simplify the binding models as a result of the calculation complexity, Applicant employed several binding models to fit the binding between nEG-Ad (n=2, 4, 6) and α-CD, including a full binding model, additive binding model, non-cooperative binding model, and statistical binding model.

Example 1.8. Transmittance Monitoring of the Formation of Polypseudorotaxanes Transmittance monitoring of the formation of polypseudorotaxanes was performed on a Shimadzu UV-Vis spectrophotometer (UV-1800) with a Thermal CUBE solid-state cooling system for thermal control between 5.0° C. and 90.0° C. with temperature precision of 0.1° C., and optical lengths for general turbidity measurements and hydrogel melting experiments were set as 10 mm and 2 mm, respectively. When α-CDs are threaded onto the PEG axles, less soluble polypseudorotaxanes are formed and they crystallize as crystalline precipitates. The reaction turned from transparent to opaque.

To understand the cascading threading and crystallization kinetic processes, a time-dependent reaction transmission change was monitored by UV-Vis light scattering upon the mixing solutions of α-CD and PEG-R from 100% transmittance to less than 1%. In typical time-dependent transmittance monitoring experiments, the reaction cuvette (optical length: 10 mm) was added with $PEG_{5k}$-R (1 mM, 2 mM for one case of PEG-(Nor)$_2$, after mixing) with various end groups and α-CD (50 mM, 100 mM for one case of PEG-(Nor)$_2$, after mixing) at 20° C. The transmittance was monitored at 550 nm, accounting for the size of polypseudorotaxanes for appropriate Rayleigh scattering. The data were acquired every 30 seconds until the transmittance was less than 1%.

Example 1.9. Temperature-Dependent Absorbance Profiles

The temperature-dependent absorbance profile (melting curve) of polypseudorotaxanes hydrogels formed by $PEG_{1-5k}$-R with various end groups and different molecular weights (PEG-OH or PEG-Ad: 5, 2.5, 1 mM for 1, 2, 5 kDa respectively; PEG-(Nor)$_2$: 5, 2.5, 1.25, 1 mM for 1, 2, 4, 5 kDa respectively, after mixing) and α-CD (50 mM, 100 mM for PEG-(Nor)$_2$, after mixing) was analyzed as follows: (1) The absorbance was normalized by defining the largest absorbance as 1.0 and the smallest absorbance as 0. (2) The first derivative of the absorbance profile was calculated quantitatively. (3) The derivatized data points were fitted by a Gaussian function to generate the fitting parameters as the expected phase transition temperature $T_m$ (melting point) and phase transition temperature variance $\sigma_T$.

Example 1.10. Annealing of Polypseudorotaxanes

The kinetically formed polypseudorotaxanes that possess higher energy were annealed at different conditions. The correspondent melting experiment was performed. $PEG_{5k}$ with various end groups ($PEG_{5k}$-R: 2 or 4 mM, after mixing) and α-CD (100 mM or 113.6 mM, after mixing) were mixed in reaction vials to form the correspondent polypseudorotaxane hydrogels (EG/CD=2.2:1 or 4:1) at 20° C. and stabilized overnight. The as-prepared samples were heated at 60° C. for 1 h and naturally cooled down in the air, or cooled down slowly in a temperature-controlled programmable oven over a period of 16 h or 40 h (cooling ramp: 60-50° C.:1° C./h, 50-20° C.: 3° C./h or 60-20° C.: 1° C./h). Samples were diluted by half to PEG (1 mM or 2 mM) and α-CD (50 mM or 56.8 mM) for each measurement. Applicant employed higher concentrations of reactants to form kinetically generated products for annealing followed by dilution because the higher concentration formed products would not be dissolved at the annealing temperatures.

Example 1.11. Rheological Measurements

Rheological measurements were performed on a stress-controlled rheometer (TA instruments, DHR-2) with a 20-mm diameter parallel plate geometry and a measuring gap of 1 mm at 20° C. All polypseudorotaxane hydrogel samples were consolidated for at least 12 h at 20° C. before the analysis unless otherwise specified. Strain sweep tests were performed to investigate the linear viscoelastic regions of the obtained polypseudorotaxane hydrogels at 25° C. The oscillation strain was increased from 0.01% to 100%. The angular frequency was set at 1 rad/s (frequency=0.16 Hz). Angular frequency sweep tests were performed to investigate the elastic (storage) and viscous (loss) moduli at 25° C. The angular frequency was increased from 0.1 rad/s to 100 rad/s (frequency increased from 0.016 Hz to 15.92 Hz). Based on the results of oscillation strain sweep experiments, the oscillation strain was set at 0.1%.

Dynamic step-strain amplitude tests were performed to investigate the self-healing properties of the polypseudorotaxane hydrogels. The oscillation strain applied was 1% and 100% in each cycle at 1 rad/s angular frequency. The duration of strain at each step was 15 s. Steady rate sweep tests were carried out to investigate the shear-thinning behaviors of the polypseudorotaxane hydrogels at 25° C. The shear rate was increased from 1 s$^{-1}$ to 100 s$^{-1}$. The elastic, loss moduli, and viscosity of ink-1 were measured at a frequency of 1 rad·s$^{-1}$ and a strain of 0.05% between 25 and 60° C.

The temperature-ramp contained a slow heating step from 25° C. to 60° C. at 3° C./min with an equilibrium time of 60 s for each temperature measurement, an isotherm step at 60° C. for 1 h, a fast cooling step from 60° C. to 25° C. at 20° C./min, and an isotherm at 25° C. for 6 h. To test the self-healing properties of ink-1 at 25 and 60° C., step-strain tests were performed with alternating 0.1% and 100% strain applied to the samples every 15 s.

Example 1.12. Single Crystal Analysis

Single crystals of $PEG_{600}$/α-CD polypseudorotaxanes suitable for single-crystal X-ray analysis were obtained by slow evaporation of an aqueous solution of a mixture of $PEG_{600}$-(OH)$_2$ and α-CD in 1:3 molar ratio (EG/CD=4.21) over 7 d. Two polymorphs were identified in the same crystallization vial. Data were collected at 20° C. in a Rigaku four circle supernova CCD diffractometer with CuKa (λ=1.54184) radiation or Rigaku Xtalab mini II with MoKa (λ=0.71073) radiation, working at 50 kV and 12 mA. Data were collected and processed using CrysAlis Pro software.

Example 1.13. Wide-Angle X-Ray Analysis (WAXS) and Small-Angle X-Ray Analysis (SAXS)

Wide-angle X-ray analysis (WAXS) and Small-angle X-ray analysis (SAXS) experiments were carried out using a Rigaku NANOPIX instrument with a Hypix-3000 detector. The water dispersions (or hydrogels) of the polypseudorotaxanes were poured into a glass capillary for X-ray measurements (WJM-glass/Muller GmbH borosilicate capillary: φ=2.0×length=80 mm) and used for SAXS and WAXS measurements. The sample-to-detector distance was calibrated with a silver behenate diffraction peak. The sheet-like form factors were fitted to the experimental SAXS profiles in the manuscript using the Igor Macros.

Example 1.14. Scanning Electron Microscope Imaging

SEM observation was conducted with a JEOL JSM-7800F microscope. The samples for SEM analyses were prepared by dipping a silicon oxide substrate into the water dispersion (or hydrogel) of the polypseudorotaxanes samples.

Examples 1.15. Tensile Tests

Tensile tests were performed on a DHR2 system (TA instruments®, New Castle, DE) with a 50 N load cell following the ATSM D638. Ink-1 was preheated at 60° C. for 1 h and injected into a Teflon mold with a rectangular shape (40×8×2 mm). The molded samples were photo-crosslinked by UV irradiation ($\lambda$=365 nm) at 20° C. for 30 min, followed by a washing process with an excess of DMSO. Freshwater was introduced to exchange DMSO for 3 times. After washing, the samples were placed in a sealed container with a saturated LiCl solution (relative humidity 11%) at 20° C. for 48 h. The 20° C. sample was prepared similarly without pre-heating. A tensile axial load was applied to the molded sample at a rate of 0.1 mm/s until failure occurred. The Young's moduli of the specimens were calculated by fitting the linear equation of the stress-strain curve before the samples yielded. The elongation process was recorded by a digital camera. Pencil penetration tests were performed using PNH-3 and PNH-8 specimens prepared in the tensile tests. The specimens were fixed by two clamps. A pencil was used to apply pressure to the fixed samples. The process was recorded by a digital camera. Optical images were recorded by a consumer-grade camera.

Example 1.16. Preparation of Ink-1

$PEG_{4k}$-$(Nor)_2$ (90 mg/mL, 22.5 mM), $\alpha$-CD (300 mg/mL, 308 mM), tetrathiol crosslinker TTC (5.5 mg/mL, 11.3 mM), and photo-initiator Irgacure D-2959 (33.3 mg/mL, 148 mM) were dissolved in $H_2O$. The reaction mixture was stirred at 60° C. for 30 min, then transferred to a syringe. The ink was cooled naturally to 20° C. and was further consolidated for 48 h before being loaded to the 3D-printer. To analyze the number of threaded $\alpha$-CDs in ink-1, the hydrogel was quickly diluted by three-fold with water and the mixture was centrifuged at 7000 rpm for 2 min. The dilution and centrifugation processes were repeated two additional times. The collected white precipitate was lyophilized for $^1$H NMR analysis and the ratio of $\alpha$-CD to $PEG_{4k}$-$(Nor)_2$ was calculated as 12.9:1 (EG/$\alpha$-CD=7.1:1), compared to the feeding ratio of $\alpha$-CD:PEG=13.7 (EG/$\alpha$-CD=6.6:1).

Example 1.17. 3D Printing

Ink-1 was loaded into syringes equipped to the BioAssemblybot 3D-printer. The printing scripts were generated by CAD software and Advanced Solution. The printing speed varied between 5-40 mm/s. High-temperature 3D-printing was conducted using BioAssemblybot 3D-printer equipped with a heating nozzle. Before printing, the heating nozzle was preheated at 60° C. for 1 h. The printed monoliths were photo-crosslinked by UV irradiation ($\lambda$=365 nm) at 20° C. for 0.5-1 h, depending on the size of the printed objects. After photo-crosslinking, the monoliths were immersed in an excess of DMSO until they became transparent. Subsequently, DMSO was decanted and water was added to exchange the solvent. The water bath was refreshed three times. The hydrogel was then immersed in an acetone bath for 2 h and transferred to a heated chamber to remove the acetone quickly, affording the xerogel. To analyze the compositions of polyrotaxane network, dried hydrogel samples prepared at 20° C. and 60° C. were hydrolyzed in 5% (v/v) $NaOD/D_2O$ until no insoluble residuals were found in the NMR tube. Three samples at each temperature were prepared for hydrolysis measurements. $PEG_{4k}$: tetra-SH: $\alpha$-CD ratios of PNH-8 and PNH-3 were measured as 1: 0.62±0.02: 8.0±0.7 and 1: 0.67±0.05: 2.9±0.4, respectively.

Example 1.18. Flower Model Design and 3D-Fabrication

A printer equipped with a 60° C. and a 20° C. nozzle was filled with ink-1. A flower model with a bilayer structure was designed. Its lower section (red-colored) and the core (black colored) were printed using the heated ink, and its top section (blue colored) was printed using the 20° C. ink. The flower model was photo-crosslinked by UV-irradiation ($\lambda$=365 nm) for 1 h. After photo-crosslinking, the monoliths were immersed in an excess of DMSO until the objects became completely transparent. The DMSO was decanted and a Rhodamine B (0.2 mM) DMSO solution was added to dye the DMSO-gel for imagining. The DMSO-gel was transferred to an aqueous bath (washed 3 times) and re-dyed using a Rhodamine B (0.2 mM) aqueous solution. The hydrogel was then immersed in a Rhodamine B (0.2 mM) acetone bath for 2 h and then placed in a heated chamber to evaporate the acetone quickly. To analyze the average number of threaded $\alpha$-CDs per PEG in the flower model, the samples were hydrolyzed in 5% (v/v) $NaOD/D_2O$ until no insoluble residuals were found in the NMR tube. Three additional samples of each section were prepared and hand-cut for hydrolysis.

Example 1.19. Moisture Induced Actuation

The dyed xerogel was placed on a copper wireframe. A humidifier was placed 5 cm underneath the frame. Moisture was introduced and the process was recorded by a digital camera.

[The hydrogels obtained in the relative humidity 0-11% chambers with different designed geometries (Demo 1-4) were transferred to another chamber with relative humidity of 15-100%. The images before and after moisturization were recorded by a digital camera.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A composition comprising a rotaxane, wherein the rotaxane comprises:
a plurality of macrocyclic rings and a polymer,
wherein each of the plurality of macrocyclic rings comprises a cavity,
wherein the cavities of the plurality of macrocyclic rings are threaded onto the polymer,
wherein the plurality of threaded macrocyclic rings comprise a plurality of different segments,
wherein each of the plurality of different segments comprises a plurality of threaded macrocyclic rings,
wherein each of the plurality of different segments is in the form of a crystalline network,
wherein the polymer has a molecular weight below 10,000 Da, and
wherein the polymer is covalently appended to one or more sterically hindered molecules.

2. The composition of claim 1, wherein the macrocyclic rings are selected from the group consisting of cyclic oligosaccharides, cyclodextrins, α-cyclodextrin (α-CD), β-cyclodextrin (β-CD), γ-cyclodextrin (γ-CD), cyclodextrin derivatives, or combinations thereof.

3. The composition of claim 1, wherein the macrocyclic rings comprise α-cyclodextrin (α-CD).

4. The composition of claim 1, wherein the composition comprises at least about 15 macrocyclic rings per polymer.

5. The composition of claim 1, wherein the composition comprises less than about 15 macrocyclic rings per polymer.

6. The composition of claim 1, wherein the polymer is selected from the group consisting of nonionic amphiphilic polymers, polyethylene glycol (PEG), poly(propylene oxide), polyalkyl ethers, polymers with a molecular weight between about 6,000 Da and about 400 Da, or combinations thereof.

7. The composition of claim 1, wherein the polymer comprises polyethylene glycol (PEG).

8. The composition of claim 1, wherein the one or more sterically hindered molecules are selected from the group consisting of cycloalkanes, cyclohexanes, camphors, adamantanes, norbornanes, bornanes, derivatives thereof, or combinations thereof.

9. The composition of claim 1, wherein the polymer is appended to a plurality of sterically hindered molecules such that the plurality of macrocyclic rings are between the plurality of sterically hindered molecules.

10. The composition of claim 9, wherein each end of the polymer is covalently appended to a sterically hindered molecule.

11. The composition of claim 1, wherein the rotaxane is associated with a macromolecule selected from the group consisting of peptides, proteins, peptoids, thiol-containing molecules, a cysteine-rich protein, or combinations thereof, and wherein the rotaxane is covalently coupled to the macromolecule through a covalent bond between the macromolecule and a sterically hindered molecule.

12. The composition of claim 1, wherein the composition is in the form of hydrogels.

13. The composition of claim 1, wherein the composition is in 3-D printable form.

14. The composition of claim 1, wherein each of the plurality of different segments comprises a different number of threaded macrocyclic rings.

15. The composition of claim 1, wherein the composition comprises a plurality of rotaxanes, wherein the rotaxanes are associated with one another through the association of their segments.

16. The composition of claim 15, wherein the segments are associated in a parallel direction.

17. A method of forming a rotaxane, said method comprising:
covalently appending one or more sterically hindered molecules onto a polymer,
wherein the polymer has a molecular weight below 10,000 Da, and
threading a plurality of macrocyclic rings onto the polymer,
wherein each of the plurality of macrocyclic rings comprises a cavity,
wherein the plurality of macrocyclic rings are threaded onto the polymer through the cavities,
wherein the plurality of threaded macrocyclic rings comprise a plurality of different segments, wherein each of the plurality of different segments comprises a plurality of threaded macrocyclic rings, and
wherein each of the plurality of different segments is in the form of a crystalline network.

18. The method of claim 17, wherein the macrocyclic rings are selected from the group consisting of cyclic oligosaccharides, cyclodextrins, α-cyclodextrin (α-CD), β-cyclodextrin (β-CD), γ-cyclodextrin (γ-CD), cyclodextrin derivatives, or combinations thereof.

19. The method of claim 17, wherein the macrocyclic rings comprise α-cyclodextrin (α-CD).

20. The method of claim 17, wherein the polymer is selected from the group consisting of nonionic amphiphilic polymers, polyethylene glycol (PEG), poly(propylene oxide), polyalkyl ethers, polymers with a molecular weight between about 6,000 Da and about 400 Da, or combinations thereof.

21. The method of claim 17, wherein the polymer comprises polyethylene glycol (PEG).

22. The method of claim 17, wherein the one or more sterically hindered molecules are selected from the group consisting of cycloalkanes, cyclohexanes, camphors, adamantanes, norbornanes, bornanes, derivatives thereof, or combinations thereof.

23. The method of claim 17, wherein the polymer is appended to a plurality of sterically hindered molecules, wherein the plurality of sterically hindered molecules are appended to a polymer such that the plurality of macrocyclic rings are between the plurality of sterically hindered molecules.

24. The method of claim 23, wherein each end of the polymer is covalently appended to a sterically hindered molecule.

25. The method of claim 17, further comprising a step of covalently coupling a macromolecule onto the rotaxane, wherein the macromolecule is selected from the group consisting of peptides, proteins, peptoids, thiol-containing molecules, a cysteine-rich protein, or combinations thereof, and wherein the rotaxane is covalently coupled to a macromolecule through a covalent bond between the macromolecule and a sterically hindered molecule.

* * * * *